(12) United States Patent
Hong et al.

(10) Patent No.: US 11,608,580 B2
(45) Date of Patent: Mar. 21, 2023

(54) WASHING MACHINE

(71) Applicant: Samsung Electronics Co., Ltd., Suwon-si (KR)

(72) Inventors: Seung Woo Hong, Seoul (KR); Da Nim Kang, Anyang-si (KR); Dong Min Lee, Ansan-si (KR); Joon Ho Lee, Seoul (KR); Bo Bin Kim, Seoul (KR); Hyeok Jin Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/499,066

(22) PCT Filed: Nov. 17, 2017

(86) PCT No.: PCT/KR2017/013097
§ 371 (c)(1),
(2) Date: Sep. 27, 2019

(87) PCT Pub. No.: WO2018/182124
PCT Pub. Date: Oct. 4, 2018

(65) Prior Publication Data
US 2020/0040503 A1 Feb. 6, 2020

(30) Foreign Application Priority Data

Mar. 27, 2017 (KR) ........................ 10-2017-0038442

(51) Int. Cl.
*D06F 31/00* (2006.01)
*D06F 34/28* (2020.01)
(Continued)

(52) U.S. Cl.
CPC .............. *D06F 34/28* (2020.02); *D06F 31/00* (2013.01); *D06F 2101/00* (2020.02); *D06F 2105/50* (2020.02)

(58) Field of Classification Search
CPC .......... D06F 31/00; D06F 34/28; D06F 33/00; D06F 2210/00; D06F 2216/00; D06F 2105/50; D06F 2101/00
See application file for complete search history.

(56) References Cited

U.S. PATENT DOCUMENTS 4,507,942 A     4/1985   Hirose et al.
4,510,778 A *   4/1985   Cotton .................... D06F 34/08
                                                           68/12.15

(Continued)

FOREIGN PATENT DOCUMENTS

CN           1464926 A     12/2003
CN     101727710 A *   6/2010
(Continued)

OTHER PUBLICATIONS

Supplementary European Search Report in connection with European Application No. 17902635.6 dated Mar. 4, 2020, 8 pages.
(Continued)

*Primary Examiner* — Michael E Barr
*Assistant Examiner* — Pallavi Chitta

(57) ABSTRACT

A washing machine having a plurality of washing apparatuses is disclosed. By providing the plurality of washing apparatuses, it is possible to separately wash the laundry as needed. In addition, by controlling the plurality of washing apparatuses using one power button and an additional option button, it is possible to implement the control panel that is easy to operate and convenient to use.

10 Claims, 21 Drawing Sheets

(51) Int. Cl.
    *D06F 105/50* (2020.01)
    *D06F 101/00* (2020.01)

(56) References Cited

U.S. PATENT DOCUMENTS

| | | | |
|---|---|---|---|
| 4,989,426 A | | 2/1991 | Kretchman et al. |
| 6,984,900 B1 * | | 1/2006 | Bruwer ............... H05B 39/044 |
| | | | 307/139 |
| 7,499,985 B2 | | 3/2009 | Linjama et al. |
| 2003/0115682 A1 | | 6/2003 | Gardner |
| 2003/0176928 A1 * | | 9/2003 | Lee ..................... D06F 33/46 |
| | | | 700/2 |
| 2006/0107233 A1 * | | 5/2006 | Deel ..................... G06F 3/0489 |
| | | | 715/810 |
| 2011/0030148 A1 | | 2/2011 | Saubert |
| 2011/0145999 A1 | | 6/2011 | Motamedi |
| 2012/0105504 A1 * | | 5/2012 | Lowles ................. G09G 3/3406 |
| | | | 345/76 |
| 2015/0346987 A1 * | | 12/2015 | Ren ...................... G09G 3/3406 |
| | | | 345/589 |
| 2016/0215432 A1 * | | 7/2016 | Kim ..................... D06F 33/00 |
| 2018/0291550 A1 * | | 10/2018 | Niu ...................... D06F 29/00 |

FOREIGN PATENT DOCUMENTS

| | | | | |
|---|---|---|---|---|
| CN | 204030963 U | | 12/2014 | |
| CN | 104278482 A | | 1/2015 | |
| CN | 104480671 A | | 4/2015 | |
| CN | 205443672 U | * | 8/2016 | |
| CN | 205443672 U | | 8/2016 | |
| CN | 106032625 A | * | 10/2016 | ............. D06F 34/32 |
| CN | 106480658 A | * | 3/2017 | ............. D06F 31/00 |
| CN | 106480659 A | * | 3/2017 | ............. D06F 34/28 |
| EP | 1882768 A2 | | 1/2008 | |
| EP | 2065504 A1 | | 6/2009 | |
| EP | 2065504 B1 | * | 6/2016 | ............. D06F 31/00 |
| EP | 3269863 A1 | | 1/2018 | |
| JP | 2004521712 A | | 7/2004 | |
| JP | 2006314806 A | | 11/2006 | |
| KR | 10-1998-0074211 A | | 11/1998 | |
| KR | 19980074211 A | * | 11/1998 | |
| KR | 10-2007-0065125 A | | 6/2007 | |
| KR | 10-2009-0030902 A | | 3/2009 | |
| KR | 10-2010-0119451 A | | 11/2010 | |
| KR | 10-2014-0101554 A | | 8/2014 | |
| KR | 10-2016-0092453 A | | 8/2016 | |
| KR | 20180076982 A | * | 7/2018 | |
| WO | 2016141714 A1 | | 9/2016 | |

OTHER PUBLICATIONS

Communication pursuant to Article 94(3) EPC dated Sep. 28, 2020 in connection with European Application No. 17902635.6, 4 pages.
Notification of reason for refusal dated Oct. 9, 2020 in connection with Korean Application No. 10-2020-0068065, 11 pages.
Office Action dated Apr. 26, 2021 in connection with India Patent Application No. 201947043472, 6 pages.
Notice of Patent Allowance dated Apr. 19, 2021 in connection with Korean Patent Application No. 10-2020-0068065, 3 pages.
Notice of Preliminary Rejection dated Feb. 16, 2021 in connection with Korean Patent Application No. 10-2017-0038442, 21 pages.
Notice of Decision of Final Rejection dated Feb. 19, 2021 in connection with Korean Patent Application No. 10-2020-0068065, 8 pages.
Non-Final Office Action dated Feb. 24, 2021 in connection with U.S. Appl. No. 17/075,474, 17 pages.
Final Office Action dated Jun. 8, 2021 in connection with U.S. Appl. No. 17/075,474, 13 pages.
The First Office Action in connection with Chinese Application No. 201780090985.3 dated May 25, 2021, 23 pages.
Non-Final Office Action dated Oct. 13, 2021, in connection with U.S. Appl. No. 17/075,474, 12 pages.
Notice of Preliminary Rejection dated Aug. 26, 2021, in connection with Korean Application No. 10-2017-0038442, 8 pages.
Notice of Preliminary Rejection dated Oct. 12, 2021, in connection with Korean Application No. 10-2021-0094331, 10 pages.
European Patent Office, "European Search Report," dated Apr. 7, 2022, in connection with European Patent Application No. 22150154.7, 9 pages.
Korean Intellectual Property Office, "Notice of Patent Allowance," dated Feb. 25, 2022, in connection with Korean Patent Application No. 10-2017-0038442, 3 pages.
Korean Intellectual Property Office, "Notice of Patent Allowance," dated Apr. 24, 2022, in connection with Korean Patent Application No. 10-2021-0094331, 3 pages.
China National Intellectual Property Administration, "The Third Office Action," dated Mar. 23, 2022, in connection with Chinese Patent Application No. 201780090985.3, 8 pages.
The Second Office Action dated Nov. 16, 2021, in connection with Chinese Application No. 201780090985.3, 18 pages.
USPTO, "Final Office Action" dated Feb. 4, 2022, in connection with U.S. Appl. No. 17/075,474, 20 pages.
ISA/KR, International Search Report and Written Opinion of the International Searching Authority, International Application No. PCT/KR2017/013097, dated May 1, 2018, 12 pages.

* cited by examiner

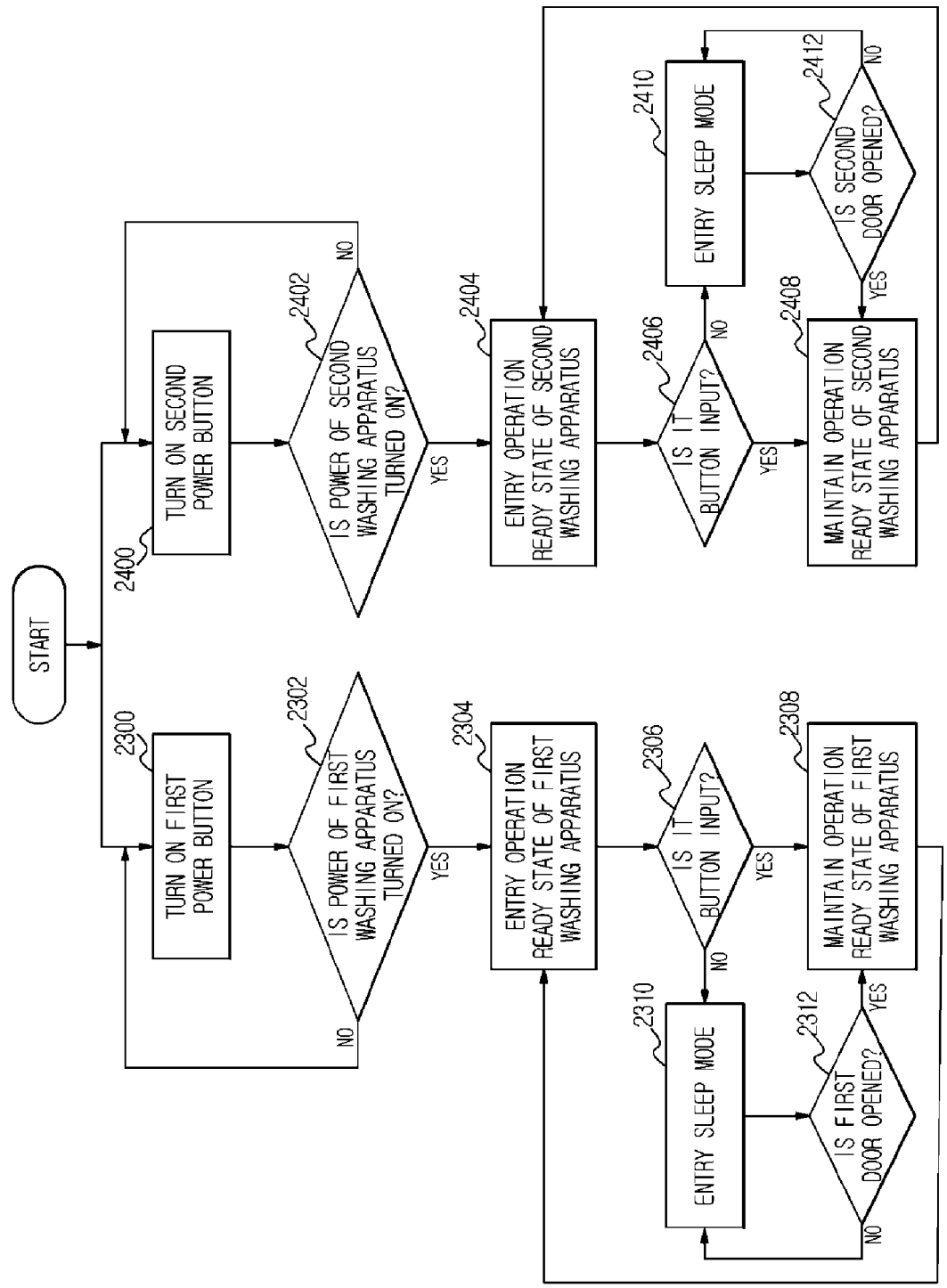

WASHING MACHINE

CROSS-REFERENCE TO RELATED APPLICATIONS

This application is a 371 National Stage of International Application No. PCT/KR2017/013097, filed Nov. 17, 2017, which claims priority to Korean Patent Application No. 10-2017-0038442, filed Mar. 27, 2017, the disclosures of which are herein incorporated by reference in their entirety.

BACKGROUND

Field

The present disclosure relates to a washing machine having a plurality of washing apparatuses.

Description of Related Art

Generally, a washing machine includes one washing apparatus (washing tub), and is an apparatus for removing contaminations from laundry using water and detergent. The washing machine performs washing of laundry through a series of operations such as a washing process, a rinsing process, and a dehydrating process using a motor as a main power. In recent times, the washing machine is configured to have a drying function, so that the washing machine can also perform a drying process of drying the dehydrated laundry.

When washing, it may be impossible for the washing machine to simultaneously wash a plurality of laundries accommodated in one washing apparatus according to types or materials of laundry. Since a conventional washing machine has one washing apparatus, the user must directly classify a plurality of laundries into various types of laundries before execution of the washing machine, and select only some laundries incapable of being simultaneously washed in one washing machine from among total laundries.

In this case, the user may feel inconvenienced because the user must select some laundries to be washed in a separate washing process from among total laundries and the washing machine must be driven several times (e.g., twice), resulting in a waste of energy and time. In addition, although the user desires to wash a small amount of laundries using a washing machine, if a drum of the washing machine is a large-capacity drum, unnecessary power consumption occurs.

SUMMARY

The present disclosure is directed to providing a washing machine having a plurality of washing apparatuses.

Further, the present disclosure is directed to providing a washing machine capable of controlling the plurality of washing apparatuses using one power button.

An aspect of the disclosure provides a washing machine including: a housing; a first washing apparatus disposed in the housing; a second washing apparatus disposed in the housing and disposed above the first washing apparatus; a control panel disposed at the front of the housing; a first user interface provided in a lower area of the control panel, configured to receive a first control command for controlling the first washing apparatus; a second user interface provided in the lower area of the control panel, configured to receive a second control command for controlling the second washing apparatus; and a third user interface provided on the control panel. The first and second user interfaces are operated in an activation mode in which the first and second washing apparatuses are controlled according to the first and second control commands, respectively and in a sleep mode in which the first and second washing apparatuses are not controlled according to the first and second control commands, respectively. The third user interface receives a third control command for switching the first and second user interfaces from the sleep mode to the activation mode.

Another aspect of the disclosure provides a washing machine including: a housing; a first washing apparatus disposed in the housing; a second washing apparatus disposed in the housing and disposed disposed above the first washing apparatus; a control panel disposed at the front of the housing; a first user interface provided in a lower area of the control panel, configured to receive a first control command for controlling the first washing apparatus; and a second user interface provided in the lower area of the control panel, configured to receive a second control command for controlling the second washing apparatus. The first and second user interfaces are operated in an activation mode in which the first and second washing apparatuses are controlled according to the first and second control commands, respectively and in a sleep mode in which the first and second washing apparatuses are not controlled according to the first and second control commands, respectively. The first user interface includes a first power button configured to receive a first mode switch command for switching the first user interface from the sleep mode to the activation mode. The second user interface includes a second power button configured to receive a second mode switch command for switching the second user interface from the sleep mode to the activation mode.

According to the above-described washing machine, by providing the plurality of washing apparatuses, it is possible to separately wash the laundry as needed. In addition, by controlling the plurality of washing apparatuses using one power button and an additional option button, it is possible to implement the control panel that is easy to operate and convenient to use.

FIG, 11 is a flowchart illustrating an individual power mode control algorithm of the washing machine according to another embodiment of the present disclosure.

Figure 12:
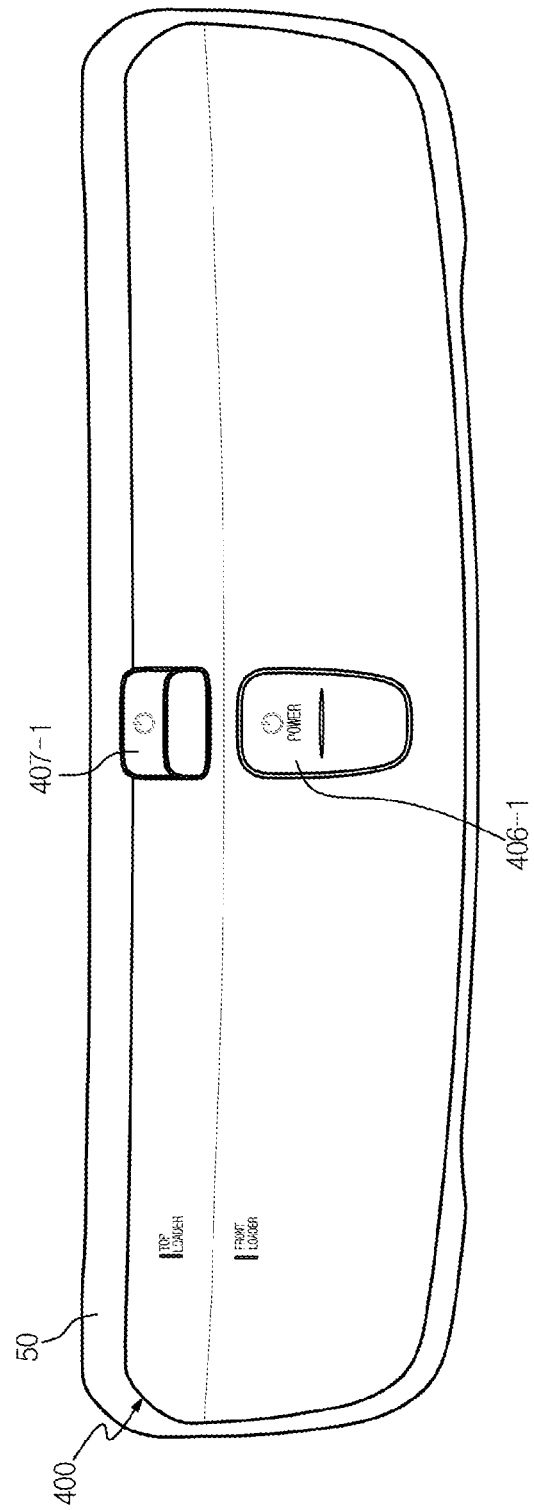

FIG. 12 is a view illustrating a state in which a control panel of a first washing apparatus is turned off as an individual power in the washing machine according to another embodiment of the present disclosure.

Figure 13:
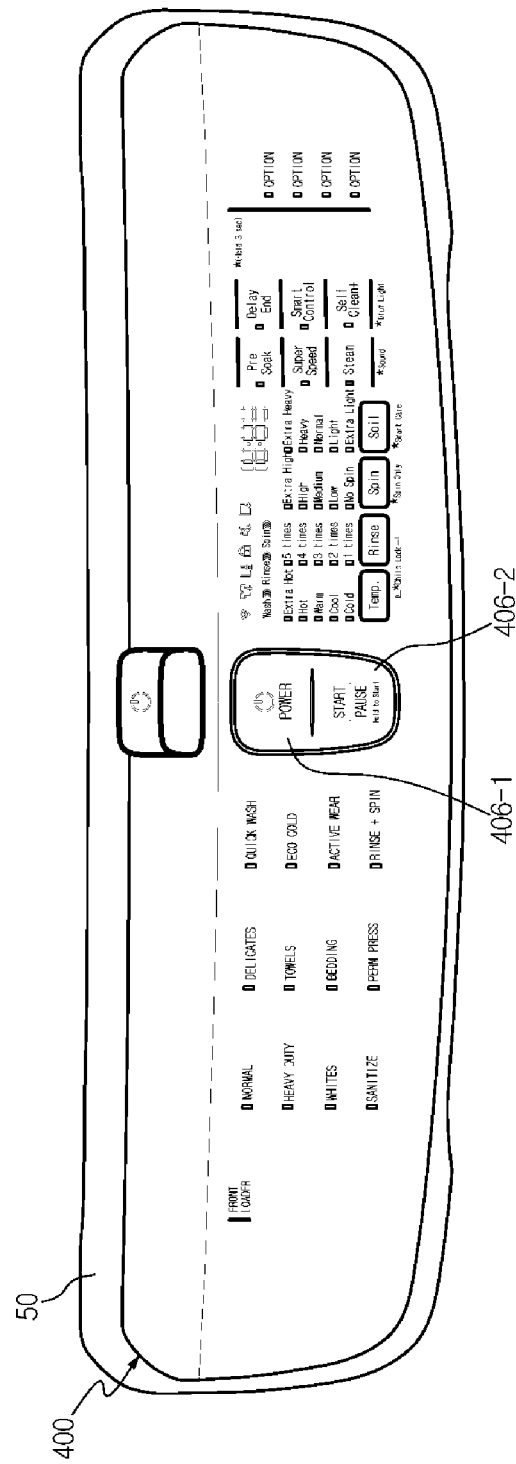

FIG. 13 is a view illustrating a state in which the control panel of the first washing apparatus is turned on as the individual power in the washing machine according to another embodiment of the disclosure.

Figure 14:
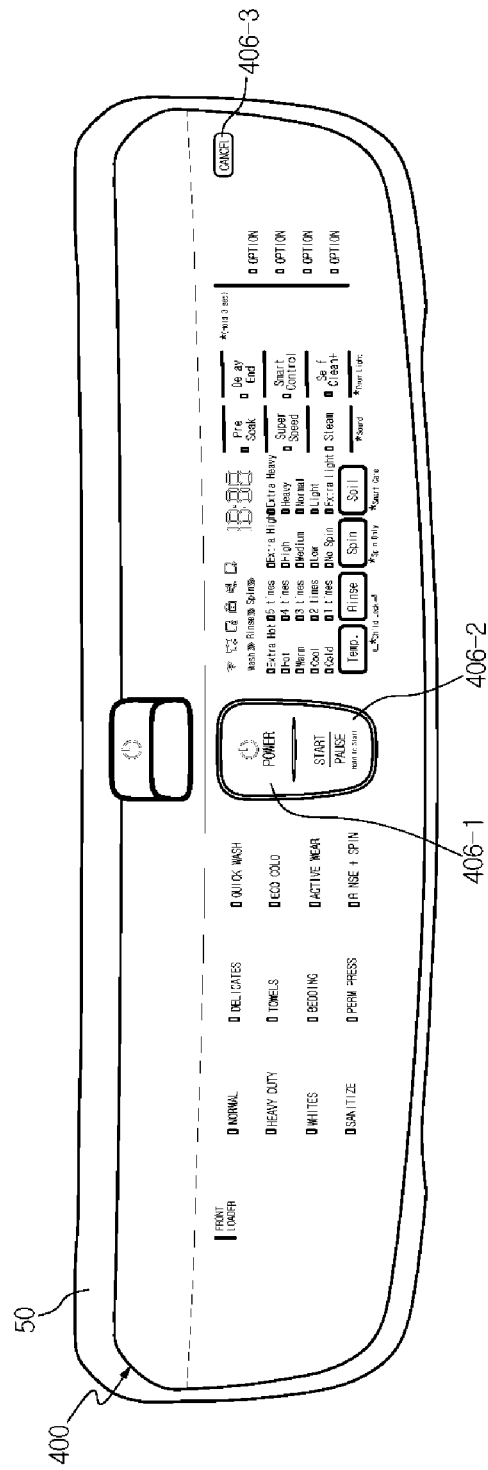

FIG. 14 is a view illustrating a state in which a laundry cancel button is activated on the control panel of the first washing apparatus in the washing machine according to another embodiment of the present disclosure.

FIG, 15 is a view illustrating a state in which a control panel of a second washing apparatus is turned off as an individual power in the washing machine according to another embodiment of the present disclosure.

Figure 16:
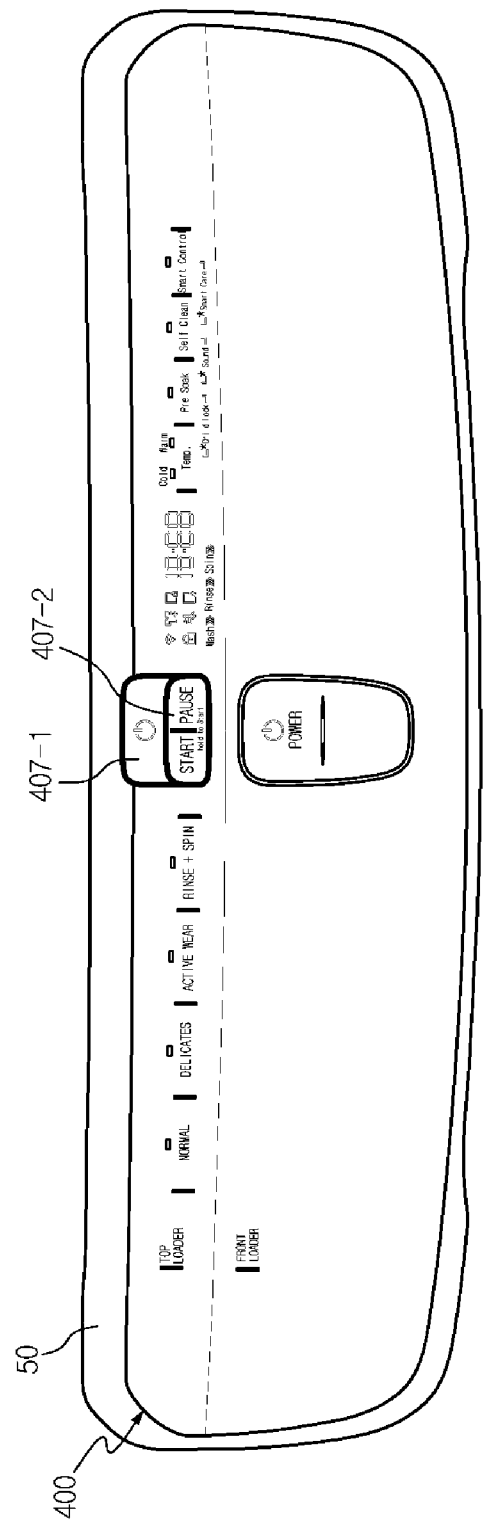

FIG. 16 is a view illustrating a state in which the control panel of the second washing apparatus is turned on as the individual power in the washing machine according to another embodiment of the present disclosure.

Figure 17:
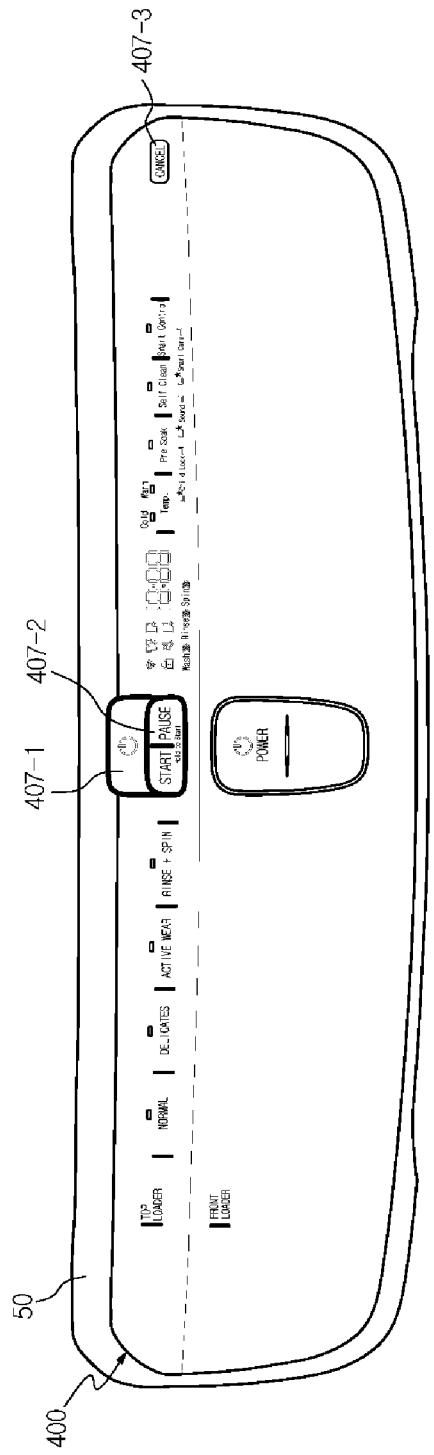

FIG. 17 is a view illustrating a state in which a laundry cancel button is activated on the control panel of the second washing apparatus in the washing machine according to another embodiment of the present disclosure.

Figure 18:
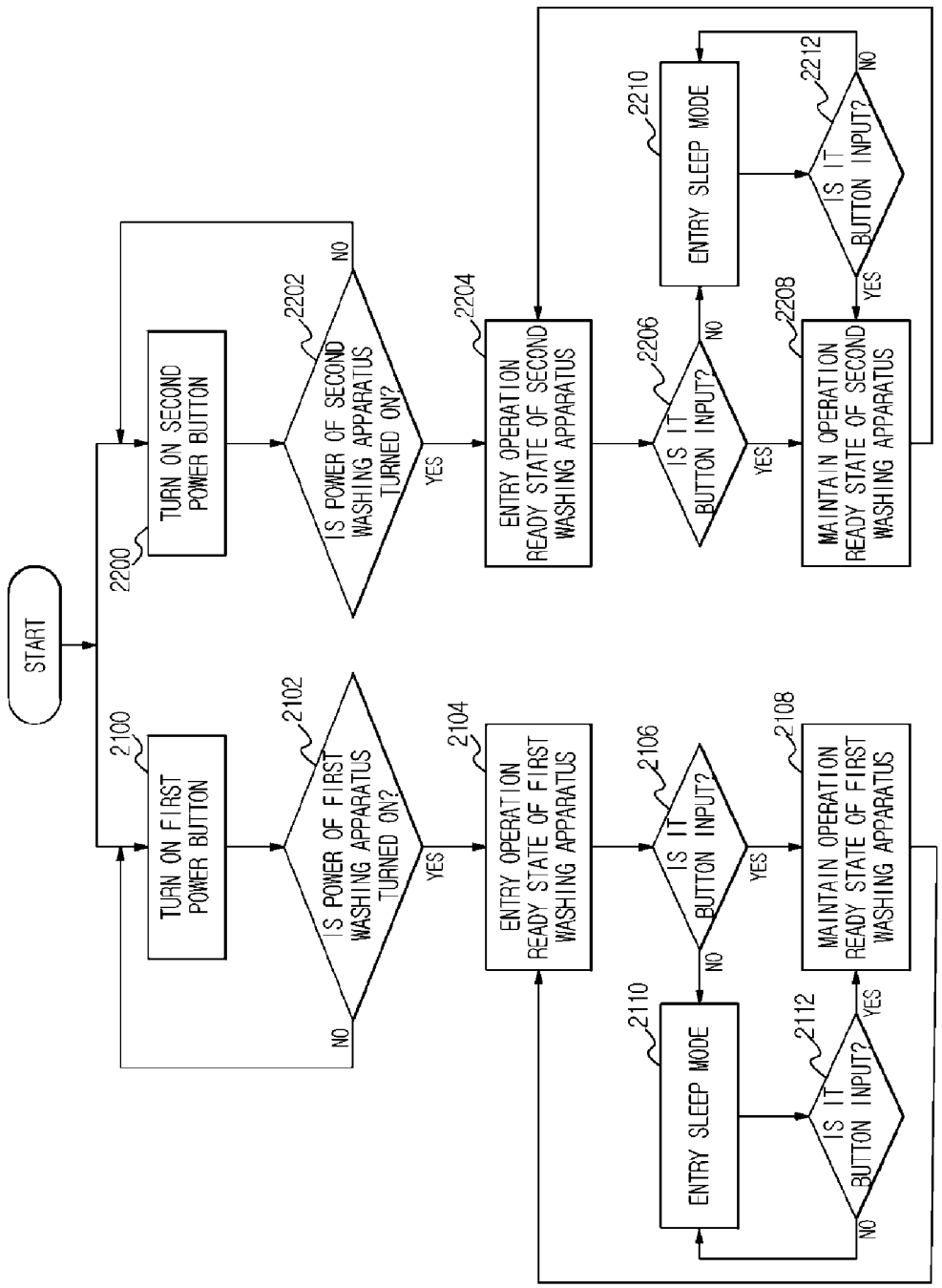

FIG. 18 is a flowchart illustrating a sleep mode control algorithm of the washing machine according to another embodiment of the present disclosure.

FIG. 19 is a flowchart illustrating an activation mode switching control algorithm of the washing machine according to another embodiment of the present disclosure.

DETAILED DESCRIPTION

Configurations illustrated in the embodiments and the drawings described in the present specification are only the preferred embodiments of the present disclosure, and thus it is to be understood that various modified examples, which may replace the embodiments and the drawings described in the present specification, are possible when filing the present application.

Hereinafter, embodiments of the present disclosure will be described in detail with reference to the accompanying drawings.

Figure 1:
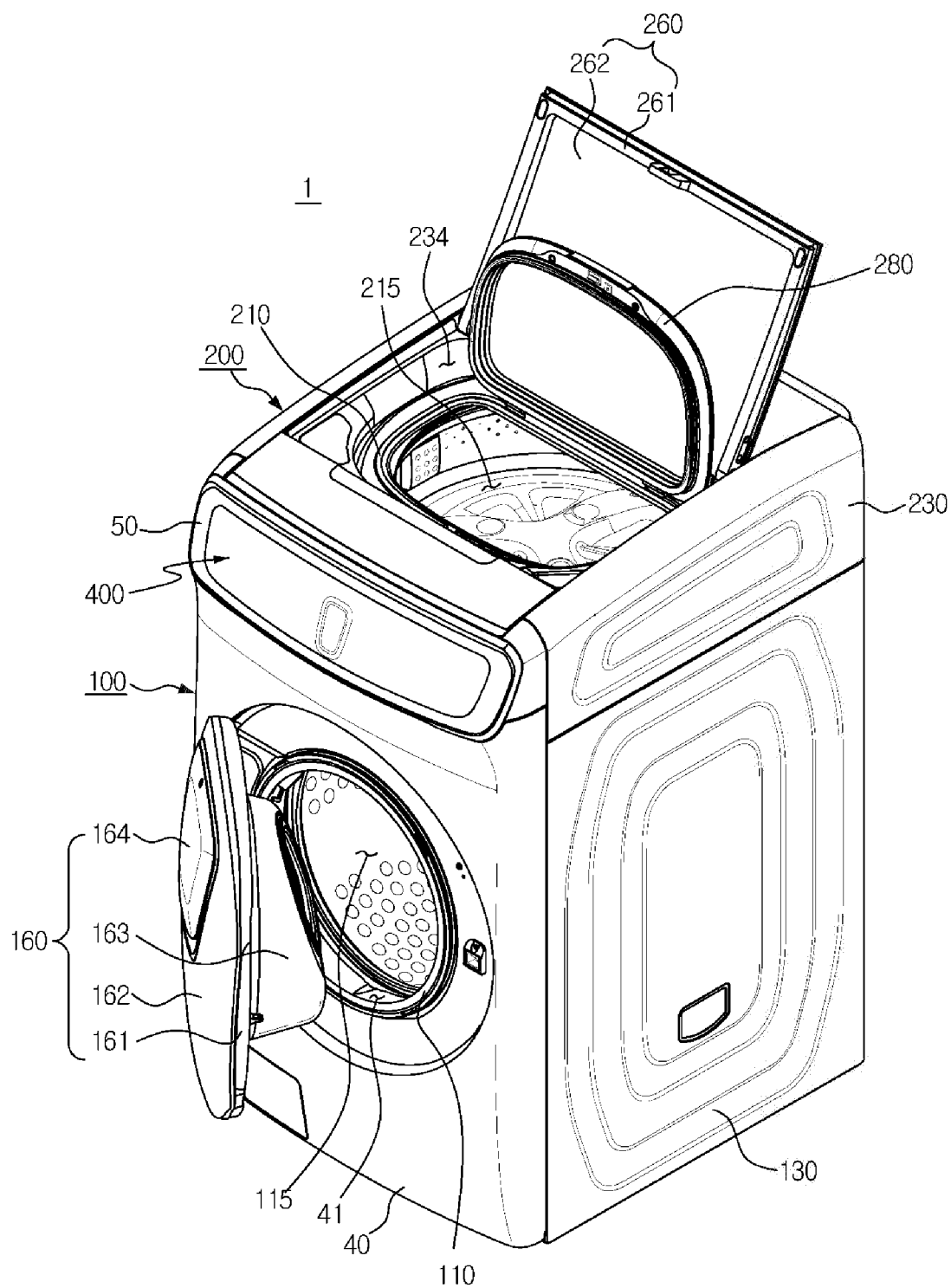
FIG. 1 is an external perspective view of a washing machine according to embodiments of the present disclosure.

FIG. 1 is an external perspective view of a washing machine according to embodiments of the present disclosure.

Referring to FIG. 1, a washing machine 1 may include a first washing apparatus 100 having a front loading method in which a first laundry inlet 41 is formed in front of a first washing space 115, and a second washing apparatus 200 having a top loading method in which a second laundry inlet 234 is formed an upper portion of a second washing space 215.

The first washing apparatus 100 and the second washing apparatus 200 may perform washing by different washing methods, and have a structure in which two washing apparatuses 100 and 200 are coupled to one platform, and may include the plurality of washing spaces 115 and 215 therein.

The first washing apparatus 100 may include a first drum 110 having the first washing space 115 formed therein. The first drum 110 may be provided in a cylindrical shape in which at least a portion of one surface thereof is opened, and may be disposed such that the opened one surface thereof faces the front side.

The first washing apparatus 100 may include a first housing 130 in which the first drum 110 is disposed therein.

The first washing apparatus 100 may include a front cover 40 provided with a first laundry inlet 41 through which laundry is put into the first washing space 115. A first door 160 may be coupled to the front cover 40 to open and dose the first laundry inlet 41.

The first door 160 may be provided to correspond to the first laundry inlet 41, and may be rotatably provided with respect to the front cover 40. The first door 160 may include a first door frame 161, a first door cover 162, and a door glass 163.

The first door 160 may include an auxiliary door 164 through which laundry is put into the first washing space 115 even when the first door 160 is closed.

The second washing apparatus 200 may include a second drum 210 having the second washing space 215 formed therein. The second drum 210 may be provided in the cylindrical shape in which at least a portion of one surface thereof is opened, and may be disposed such that the opened one surface thereof faces upward.

The second washing apparatus 200 may include a second housing 230 in which the second drum 210 is disposed therein, and a lower portion thereof is opened. The second washing apparatus 200 may be disposed in the second housing 230, and may include a second door 260 for opening and closing the second laundry inlet 234. The second door 260 may be provided to correspond to the second laundry inlet 234, and may include a second door frame 261 and a second door cover 262. The second door 260 may include a third door 280 through which laundry is put into the second washing space 215 even when the second door 120 is closed.

In addition, the washing machine 1 may include a control panel 50 disposed above the front cover 40 for operating the washing machine 1. The control panel 50 is provided with a user interface 400 for receiving washing setting information related to the operation of the washing machine 1 and displaying various information to the user. The user interface 400 may include an inputter for receiving a user command from the user, and a display for displaying various operation information of the washing machine 1 to the user according to the inputted user command. The user interface 400 may be provided at the front of the washing machine 1 for the convenience of the user. The user interface 400 will be described with reference to FIG. 2.

Figure 2:
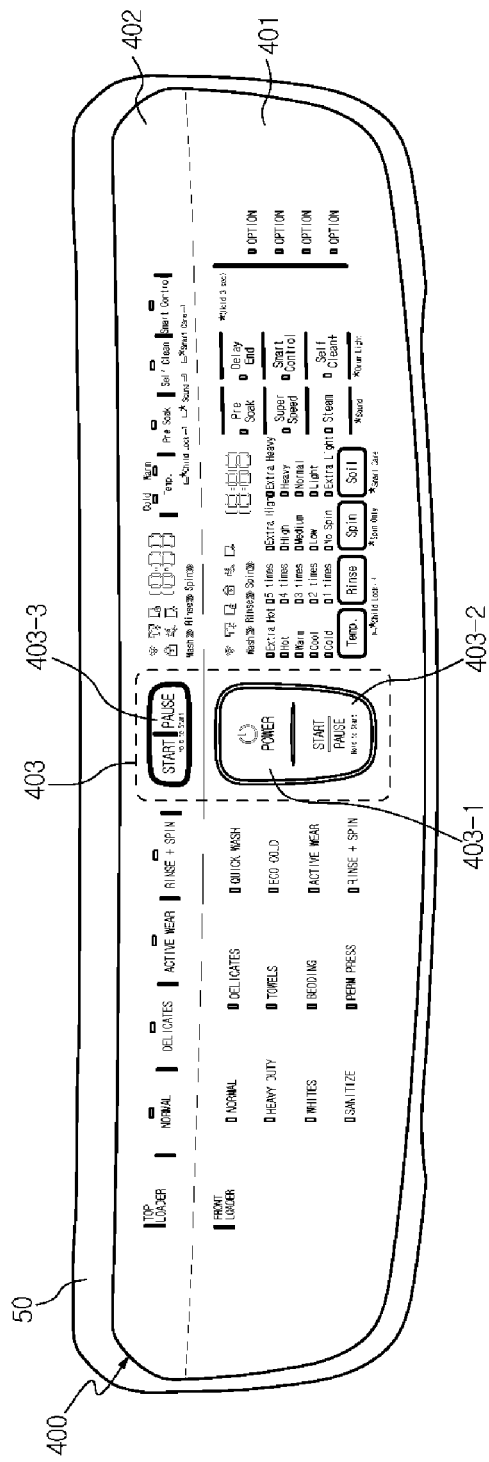
FIG. 2 is a view illustrating a control panel of the washing machine according to an embodiment of the present disclosure.

FIG. 2 is a view illustrating a control panel of the washing machine according to an embodiment of the present disclosure.

Referring to FIG. 2, the user interface 400 may be provided in the control panel 50 to interact with the user. For example, the user interface 400 may receive a user input for the first and second washing apparatuses 100 and 200 from the user, and may display the user input or operation information corresponding to a process state.

The user interface 400 may include a first user interface 401 provided in a lower area of the control panel 50 and configured to receive a first control command for controlling the first washing apparatus 100, a second user interface 402 provided in the upper area of the control panel 50 and configured to receive a second control command for controlling the second washing apparatus 200.

The first and second user interfaces 401 and 402 may be operated in an activation mode in which the first and second washing apparatuses 100 and 200 are controlled according to the first and second control commands, respectively, and a sleep mode in which the first and second washing apparatuses 100 and 200 are not controlled according to the first and second control command, respectively.

The first and second user interfaces 401 and 402 may include a plurality of buttons (e.g., reservation, wash water temperature, number of rinsing, washing, rinsing, dehydration, selection of a water level, etc.) through which user commands related to operations of the washing machine 1 are input. The plurality of buttons may include a wash water temperature button for selecting the wash water temperature, a number of rinsing button for selecting the number of rinsing, and a course selection button for selecting a washing course (such as a standard course, a wool course, a boiling course, a drying course, etc.) according to the kinds of laundry.

In addition, the first and second user interfaces 401 and 402 may include additional option buttons for simultaneously controlling the first and second washing apparatuses 100 and 200.

The user interface 400 may further include a third user interface 403 that is provided in the lower area of the control panel 50 and receives a third control command for switching the first and second user interfaces 401 acid 402 from the sleep mode to the activation mode.

The third user interface 403 may include an integrated power button 403-1 (hereinafter, referred to as a "power button") for simultaneously controlling power of the first and second washing apparatuses 100 and 200, a first start button 403-2 (START/PAUSE button) for starting or pausing the operation of the first washing apparatus 100, and a second start button 403-3 (START/PAUSE button) for starting or pausing the operation of the second washing apparatus 200.

The power button 403-1 is configured to simultaneously turn on or turn off the power of the first washing apparatus 100 and the second washing apparatus 200 with one button.

The first and second start buttons 403-2 and 403-3 are configured separately because separate power buttons of the first washing apparatus 100 and the second washing apparatus 200 are not provided separately.

Figure 3:
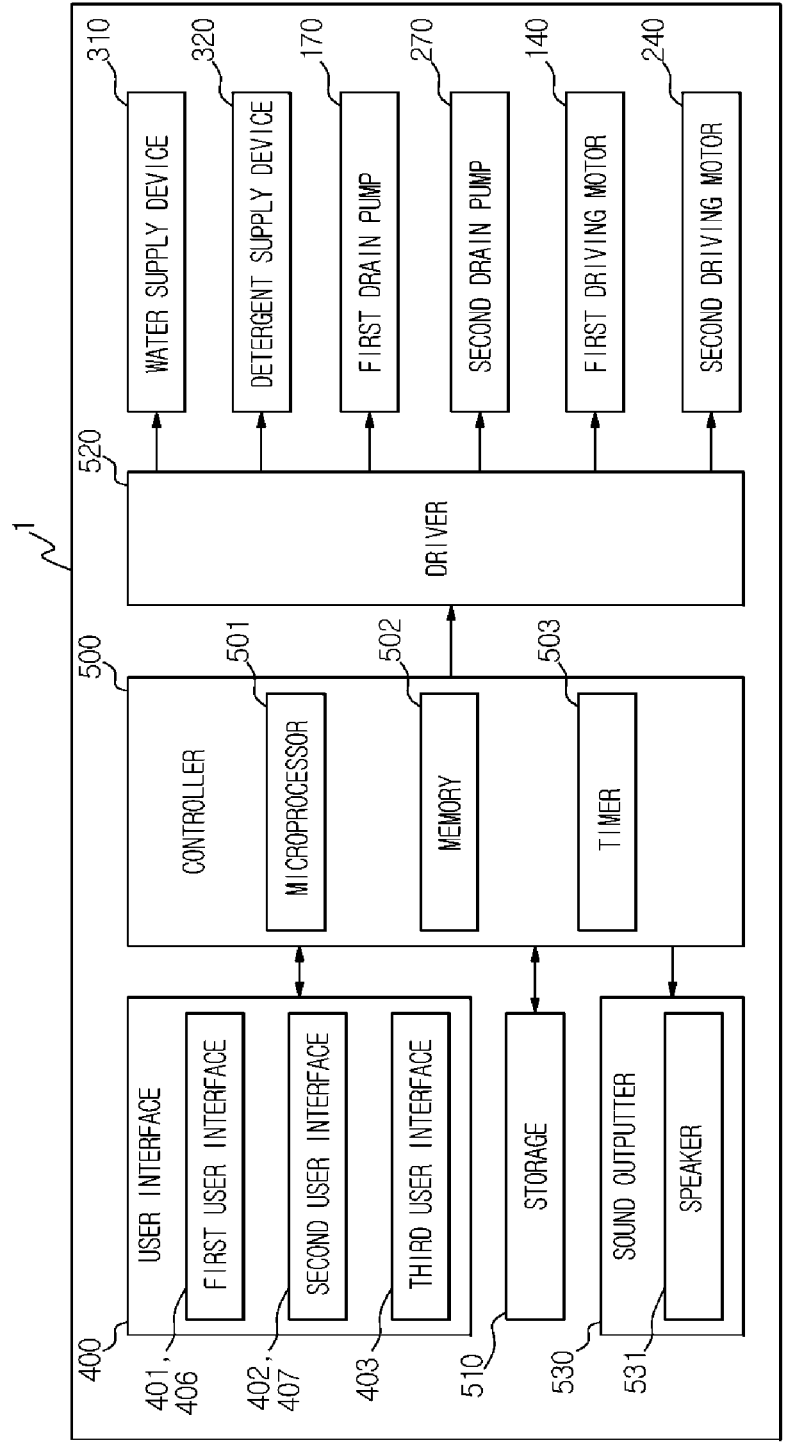
FIG. 3 is a control block diagram of the washing machine according to an embodiment of the present disclosure.

FIG. 3 is a control block diagram of the washing machine according to an embodiment of the present disclosure.

Referring to FIG. 3, the washing machine 1 may further include the user interface 400, a controller 500, a storage 510, a driver 520, and a sound outputter 530.

The user interface 400 may interact with the user. For example, the user interface 400 may receive the user input for the first and second washing apparatuses 100 and 200 from the user, and may display the user input or the operation information corresponding to the process state.

The user interface 400 may be installed at the front of the washing machine 1 for the convenience of the user. For example, as illustrated in FIG. 1, the user interface 400 may be installed in the control panel 50. Hereinafter, the user interface 400 may be installed on the control panel 50 as an example, but an installation position of the user interface 400 is not limited thereto. For example, the user interface 400 may be installed anywhere the user can operate and view it.

In addition, the user interface 400 may include a wake up function that is automatically activated when the user approaches within a certain range. For example, when the user approaches within the certain range, the user interface 400 may be activated. In other words, the user interface 400 may be turned on. On the other hand, when the user deviates from the certain range, the user interface 400 may be deactivated. In other words, the user interface 400 may be turned off.

The controller 500 may control overall operations of the washing machine 1, such as a washing process, a rinsing process, and a dehydrating process, according to the washing operation information input from the user interface 400, and may include a microprocessor 501, a memory 502, and a timer 503.

The timer 503 may count operating times of the first washing apparatus 100 and the second washing apparatus 200.

After the power button 401 is turned on, when a predetermined time (about 3 minutes) elapses without a button input from any one of the plurality of washing apparatus 100 and 200, the controller 500 may control the user interface 400 to enter the sleep mode. The controller 500 may minimize power consumption by entering the sleep mode, and may clearly distinguish between the washing apparatus 100 or 200 that is in operation and the washing apparatus 200 or 100 that is not in operation.

In addition, after entering the sleep mode, the controller 500 may control the sleep mode to be released by inputting a wake up button or by all button inputs of the user interface 400.

After turning on the power button 401, when the predetermined time (about 3 minutes) elapses without the button input at both washing apparatuses 100 and 200, the controller 500 may turn off the washing machine 1.

In addition, the controller 500 may control the driving of the user interface 400 to display the washing operation information input according to a user's operation command.

The storage 510 may store a control program and control data for controlling the operation of the washing machine 1 and various application programs and application data for performing various functions according to the user input.

The driver 520 may drive a water supply device 310, a detergent supply device 320, first and second drain pumps 170 and 270, and first and second driving motors 140 and 240 related to the operation of the washing machine 1 according to a driving control signal of the controller 500.

The sound outputter 530 may include a speaker 531 that converts an electrical signal into a sound. Here, the sound outputter 530 may receive the electrical sound signal from the controller 500 and output the sound corresponding to the received electrical sound signal.

The operation processes and effects of the washing machine according to the embodiments of the disclosure will hereinafter be described in detail.

First, turning on or off of the control panel 50 of the first and second washing apparatuses 100 and 200 with integrated power, and a process of cancelling the first or second washing apparatuses 100 or 200 through washing cancel buttons 404 and 405 will be described with reference to FIGS. 4 to 7.

Figure 4A:
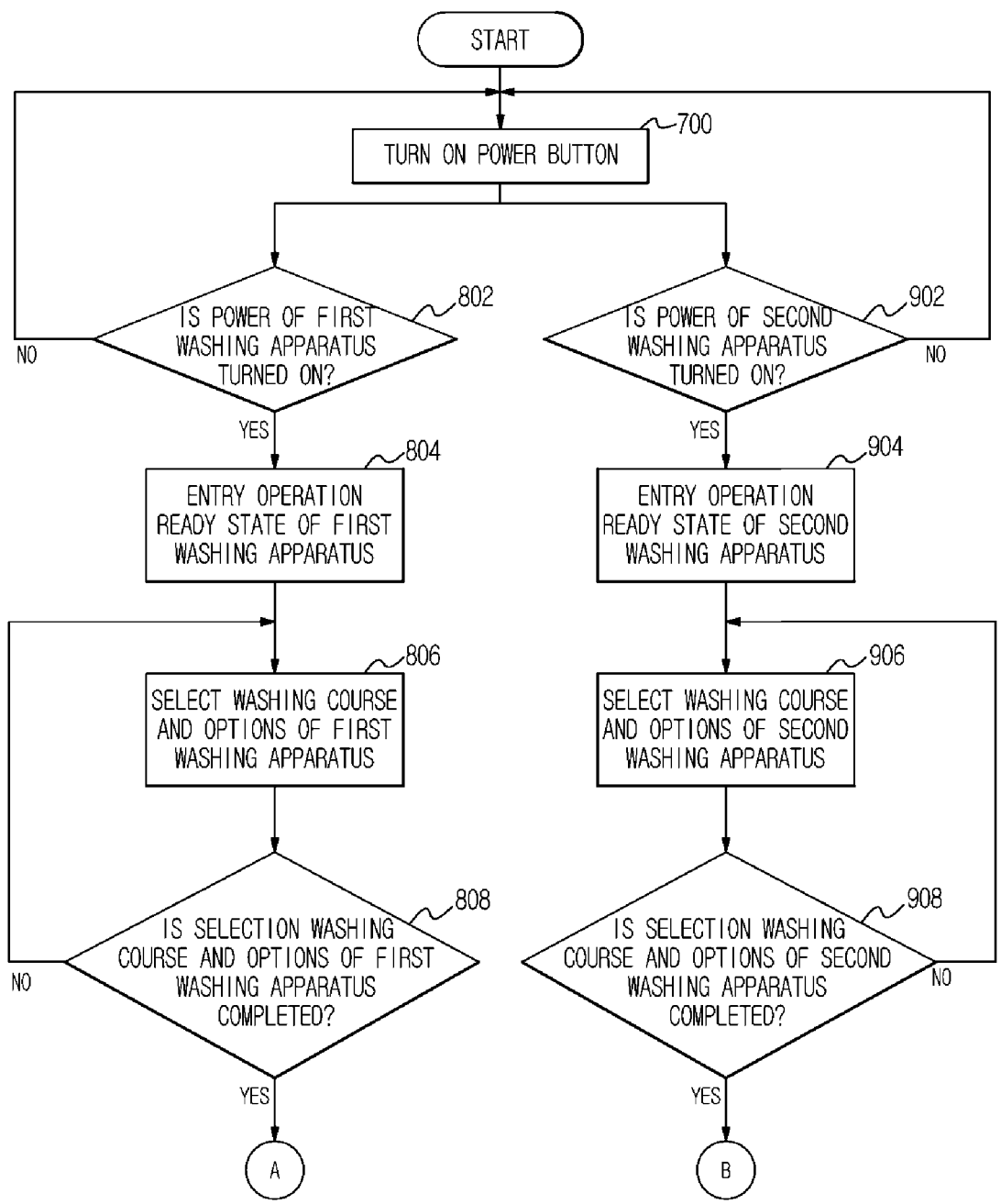
FIG. 4 is a flowchart illustrating an integrated power mode control algorithm of the washing machine according to an embodiment of the present disclosure.
Figure 4B:
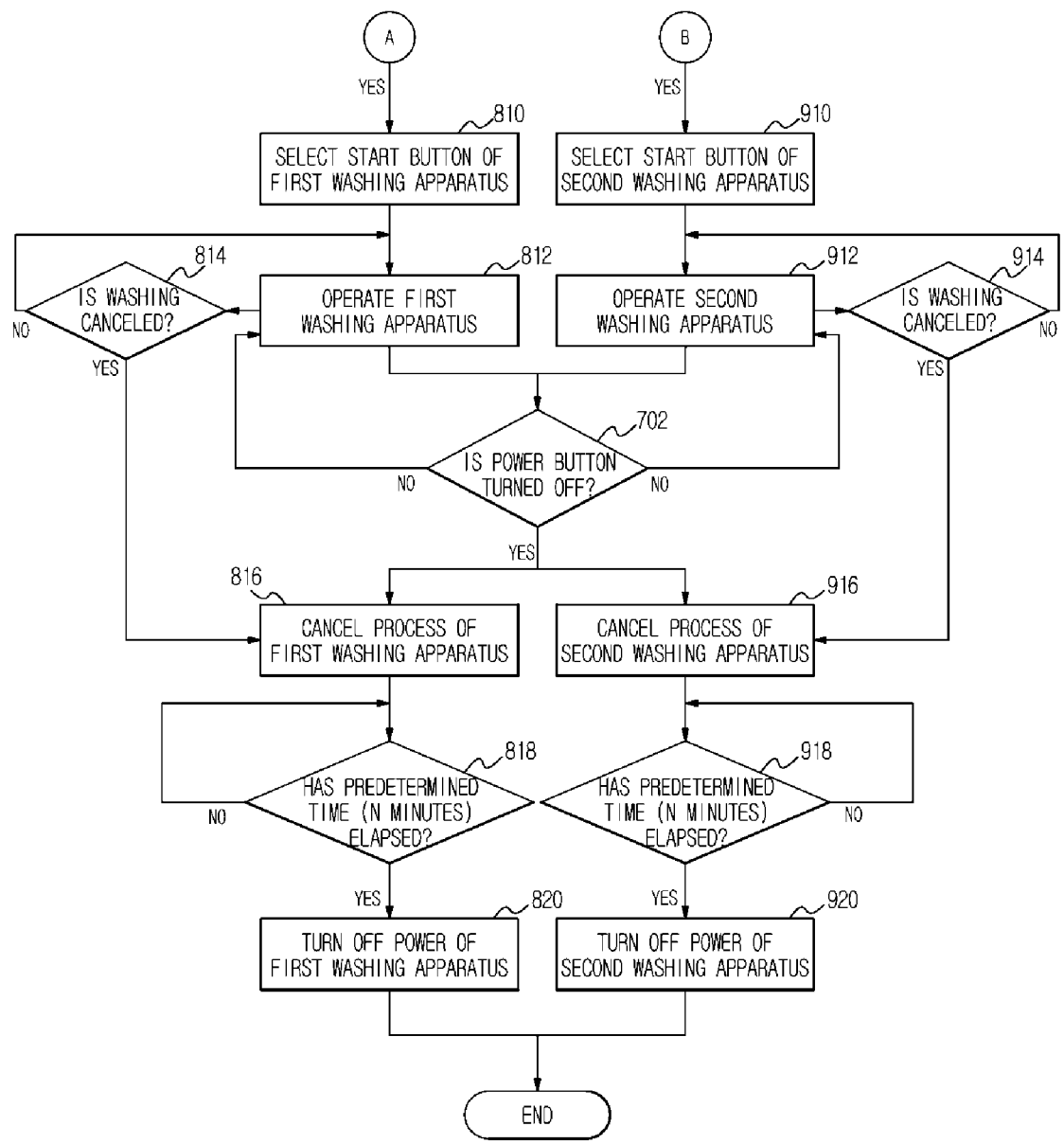
Figure 5:
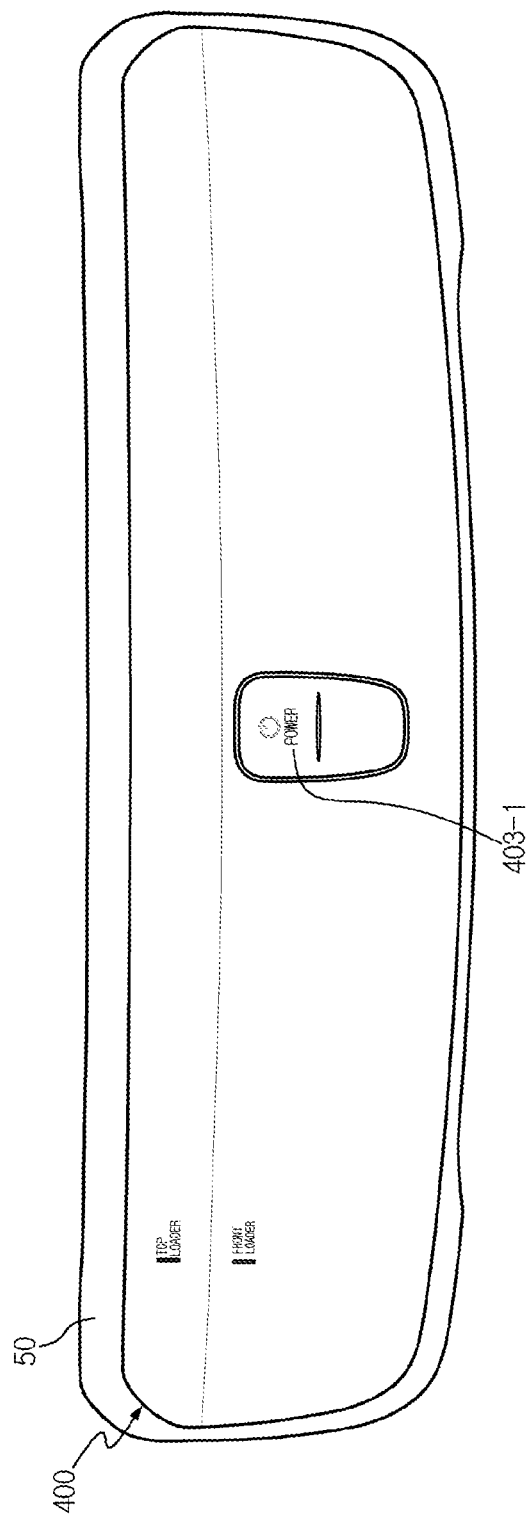
FIG. 5 is a view illustrating a state in which a control panel of a plurality of washing apparatuses is turned off as an integrated power in the washing machine according to an embodiment of the present disclosure.
Figure 6:
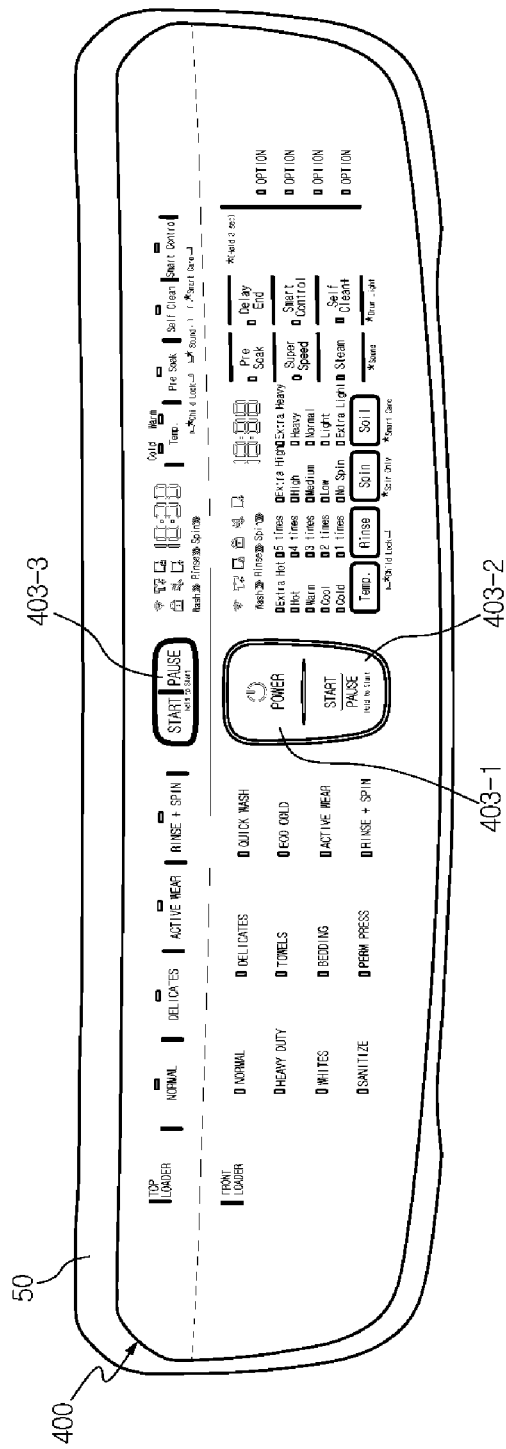
FIG. 6 is a view illustrating a state in which the control panel of the plurality of washing apparatuses is turned on as an integrated power in the washing machine according to an embodiment of the present disclosure.
Figure 7:
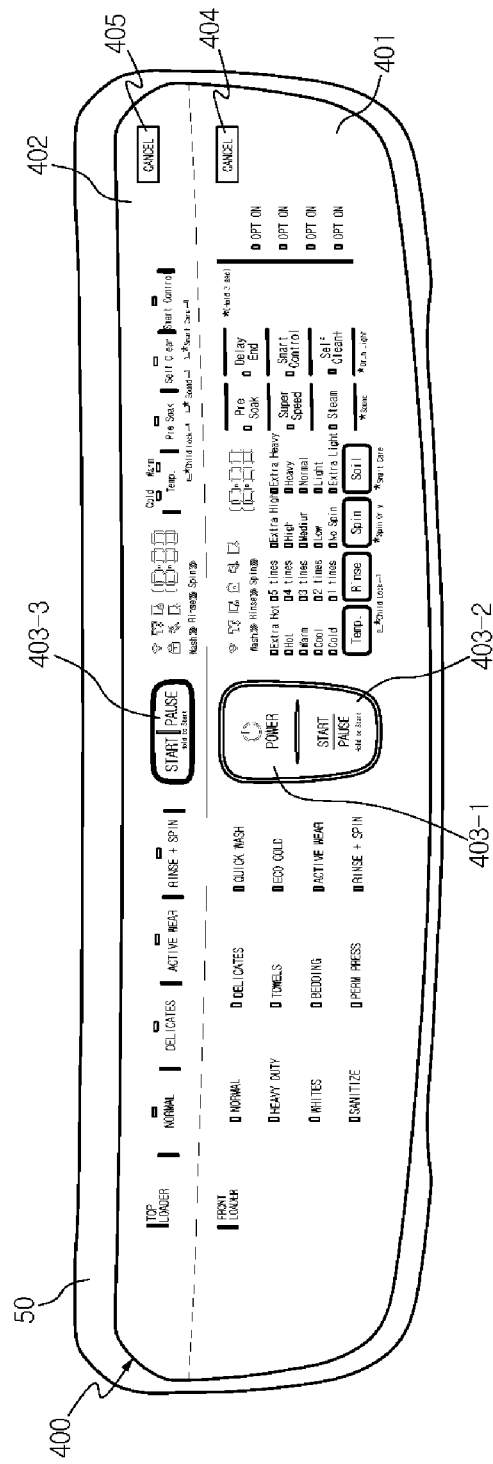
FIG. 7 is a view illustrating a state in which a laundry cancel button is activated on the right side of the control panel in the washing machine according to an embodiment of the present disclosure.

FIG. 4 is a flowchart illustrating an integrated power mode control algorithm of the washing machine according to an embodiment of the present disclosure, FIG. 5 is a view illustrating a state in which a control panel of a plurality of washing apparatuses is turned off as an integrated power in the washing machine according to an embodiment of the present disclosure, FIG. 6 is a view illustrating a state in which the control panel of the plurality of washing apparatuses is turned on as an integrated power in the washing machine according to an embodiment of the present disclosure, and FIG. 7 is a view illustrating a state in which a laundry cancel button is activated on the right side of the control panel in the washing machine according to an embodiment of the present disclosure.

Referring to FIG. 4, the user may turn on the power button 403-1 of the third user interface 403 provided on the control panel 50 (700).

When the power button 403-1 is turned on, the first washing apparatus 100 and the second washing apparatus 200 are simultaneously turned on while the user interface 400, which has been turned off as illustrated in FIG. 5, is turned on as illustrated in FIG, 6.

In a state where the power of the first washing apparatus 100 and the second washing apparatus 200 is simultaneously turned on, the controller 500 may determine whether the power of the first washing apparatus 100 is turned on (802).

When the power of the first washing apparatus 100 is turned on, the first washing apparatus 100 may enter an operation ready state (804).

When the first washing apparatus 100 enters the operation ready state, the user may select the washing course and options of the first washing apparatus 100 using the first user interface 401 (806). The washing course may include the standard course, a delicate course, the wool course, the towel course, a bedding course, and the like, and the options may include wash water temperature, the number of rinsing, dehydration strength, and the like.

Subsequently, the controller 500 may determine whether a selection of the washing course and options of the first washing apparatus 100 is completed (808).

As a result of the determination of operation 808, when the selection of the washing course and options of the first washing apparatus 100 is not completed, the controller 500 may return to operation 806 to proceed with the subsequent operation.

In operation 808, when the selection of the washing course and options of the first washing apparatus 100 is completed, the user may select the first start button 403-2 of the first washing apparatus 100 (810)

When the first start button 403-2 is selected, the first washing apparatus 100 may start the operation according to the selected washing course and options and proceed with the washing process, the rinsing process, and the dehydrating process (812).

When the operation of the first washing apparatus 100 is started, as illustrated in FIG. 7, the first and second washing cancel buttons 404 and 405 may be activated in the user interface 400.

As such, when the user selects the first washing cancel button 404 of the first washing apparatus 100 while the washing process, the rinsing process, and the dehydrating process of the first washing apparatus 100 are performed, the controller 500 may determine whether the first washing cancel button 404 is selected (814).

As the result of the determination of operation 814, when the first washing cancel button 404 is not selected, the controller 500 may return to operation 812 to continue the process of the first washing apparatus 100.

In operation 814, when the first washing cancel button 404 is selected, the controller 500 may cancel the process of the first washing apparatus 100 (816).

Subsequently, the controller 500 may count the time at which the process of the first washing apparatus 100 is canceled by using the built-in timer 503, and determine whether the counted time has elapsed the predetermined time (N minutes; a reference time for determining whether the process of the first washing apparatus is canceled, about 3 minutes) (818). This is to determine whether the predetermined time (about 3 minutes) has elapsed since the first washing cancel button 404 was selected and this is because the user may press the first washing cancel button 404 by mistake.

As the result of the determination of operation 818, when the time, in which the process of the first washing apparatus 100 is canceled, elapses the predetermined time (N minutes), the controller 500 may determine that the predetermined time elapses after the first washing cancel button 404 is selected.

Therefore, after the predetermined time elapses after the first washing cancel button 404 is selected, the controller 500 may turn off the power of the first washing apparatus 100 (820) and terminate the operation.

Meanwhile, in the state where the power of the first washing apparatus 100 and the second washing apparatus 200 is simultaneously turned on because the power button 403-1 is turned on in operation 700, the controller 500 may determine whether the power of the second washing apparatus 200 is turned on (902).

When the power of the second washing apparatus 200 is turned on, the second washing apparatus 200 may enter an operation ready state (904).

When the second washing apparatus 200 enters the operation ready state, the user may select the washing course and options of the second washing apparatus 200 using the second user interface 402 (906). Subsequently, the controller 500 may determine whether a selection of the washing course and options of the second washing apparatus 200 is completed (908).

As the result of the determination of operation 908, when the selection of the washing course and options of the second washing apparatus 200 is not completed, the controller 500 may return to operation 906 to proceed with the subsequent operation.

In operation 908, when the selection of the washing course and options of the second washing apparatus 200 is completed, the user may select the second start button 403-3 of the second washing apparatus 200 (910).

When the second start button 403-3 is selected, the second washing apparatus 200 may start the operation according to the selected washing course and options and proceed with the washing process, the rinsing process, and the dehydrating process (912).

Figure 9:
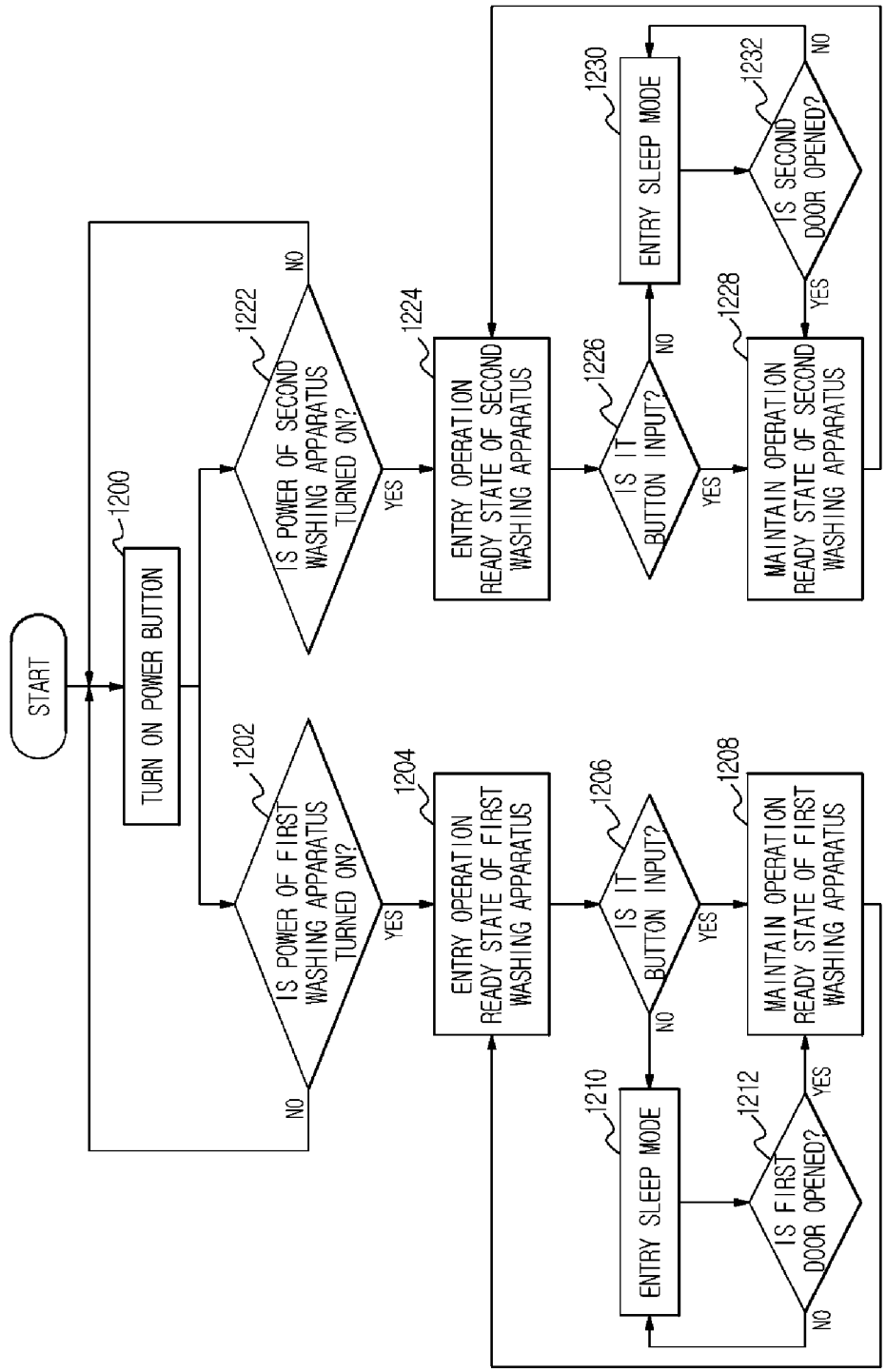
FIG. 9 is a flowchart illustrating an activation mode switching control algorithm of the washing machine according to an embodiment of the present disclosure.

When the operation of the second washing apparatus 200 is started, as illustrated in FIG. 9, the first and second washing cancel buttons 404 and 405 may be activated in the user interface 400.

As such, when the user selects the second washing cancel button 405 of the second washing apparatus 200 while the washing process, the rinsing process, and the dehydrating process of the second washing apparatus 200 are performed, the controller 500 may determine whether the second washing cancel button 405 is selected (914).

As the result of the determination of operation 914, when the second washing cancel button 405 is not selected, the controller 500 may return to operation 912 to continue the process of the second washing apparatus 200.

In operation 914, when the second washing cancel button 405 is selected, the controller 500 may cancel the process of the second washing apparatus 200 (916).

Subsequently, the controller 500 may count the time at which the process of the second washing apparatus 200 is canceled by using the built-in timer 503, and determine whether the counted time has elapsed the predetermined time (N minutes; the reference time for determining whether the process of the second washing apparatus is canceled, about 3 minutes) (918). This is to determine whether the predetermined time (about 3 minutes) has elapsed since the second washing cancel button 405 was selected and this is because the user may press the second washing cancel button 405 by mistake.

As the result of the determination of operation 918, when the time, in which the process of the second washing apparatus 200 is canceled, elapses the predetermined time (N minutes), the controller 500 may determine that the predetermined time elapses after the second washing cancel button 405 is selected.

Therefore, after the predetermined time elapses after the second washing cancel button 405 is selected, the controller 500 may turn off the power of the second washing apparatus 200 (920) and terminate the operation.

On the other hand, during the process (washing process, rinsing process, and dehydrating process) of the first washing apparatus 100 and the second washing apparatus 200 in operation 812 and operation 912, when the user turns off the power button 403-1, the controller 500 may determine whether the power button 403-1 is turned off (702).

As the result of the determination in operation 702 when the power button 403-1 is not turned off, the controller 500 may return to operations 812 and 912 to continue the process of the first washing apparatus 100 and the second washing apparatus 200.

On the other hand, when the power button 403-1 is turned off as the result of the determination of operation 702, the controller 500 may proceed with operations 816 and 916 to cancel the process of the first washing apparatus 100 and the second washing apparatus 200, and proceed with the subsequent operation.

As such, the washing machine 1 according to an embodiment of the present disclosure may simultaneously turn on or off the power the first washing apparatus 100 and the second washing apparatus 200 using the power button 403-1 provided on the control panel 50. That is, one power button 403-1 may perform the function of integrated power. Next, a process of entering the sleep mode when the predetermined time elapses without the button input to the first or second user interface 401 or 402 will be described with reference to FIG. 8, FIG. 8 is a flowchart illustrating a sleep mode control algorithm of the washing machine according to an embodiment of the present disclosure.

Figure 8:
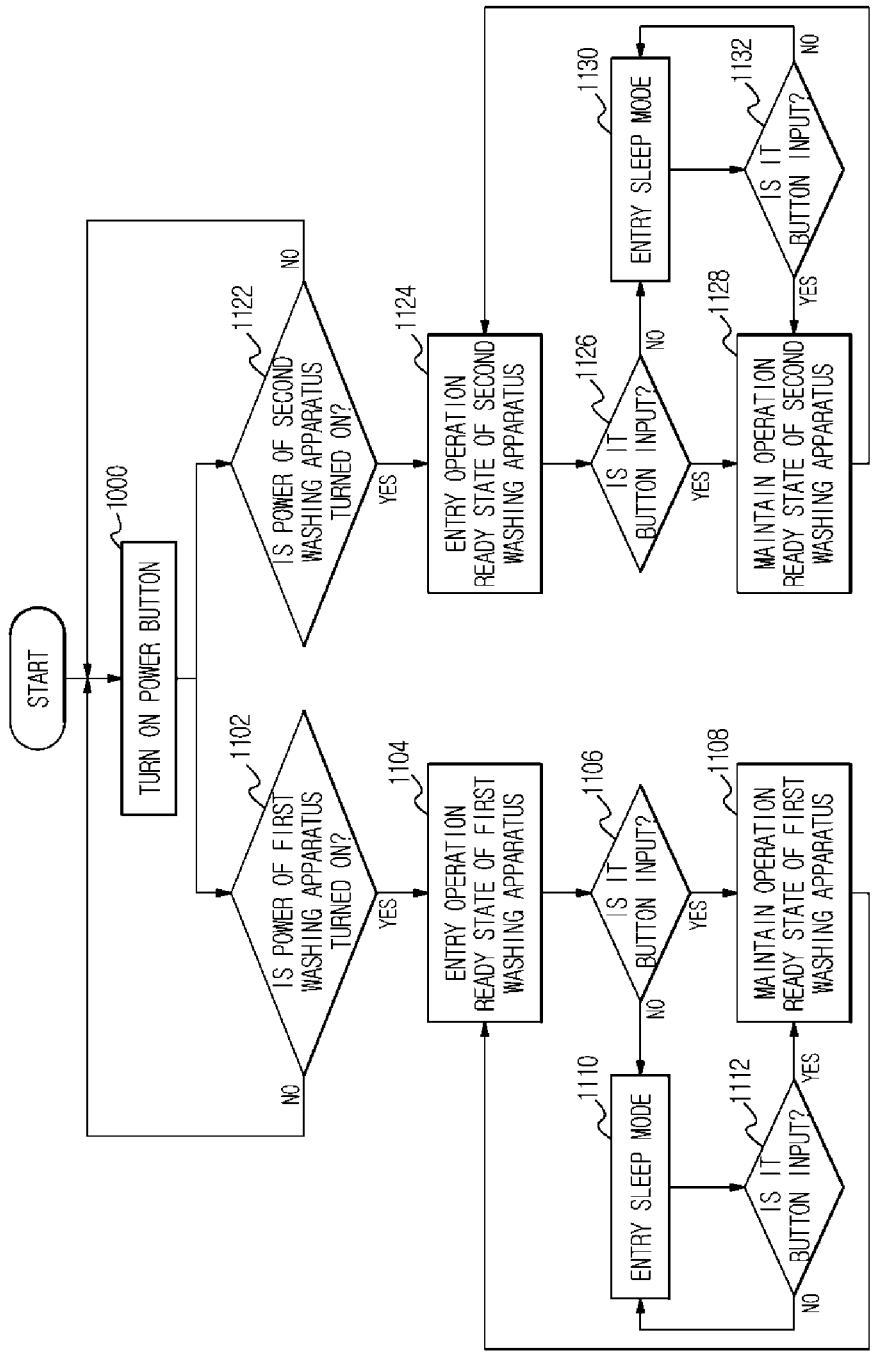
FIG. 8 is a flowchart illustrating a sleep mode control algorithm of the washing machine according to an embodiment of the present disclosure.

Referring to FIG. 8, the user may turn on the power button 403-1 of the user interface 400 provided in the control panel 50 (1000).

When the power button 403-1 is turned on, the first washing apparatus 100 and the second washing apparatus 200 are simultaneously turned on while the user interface 400, which has been turned off, is turned on (see FIGS. 5 and 6).

In the state where the power of the first washing apparatus 100 and the second washing apparatus 200 is simultaneously turned on, the controller 500 may determine whether the power of the first washing apparatus 100 is turned on (1102).

When the power of the first washing apparatus 100 is turned on, the first washing apparatus 100 may enter the activation mode which is the operation ready state (1104).

When the first washing apparatus 100 enters the operation ready state, the user may input the button for selecting the washing course and options of the first washing apparatus 100 using the user interface 400.

Accordingly, the controller 500 may determine whether there is a button input of the first user interface 401 corresponding to the first washing apparatus 100 (1106).

As the result of the determination of operation 1106, when there is the button input of the first user interface 401, the first washing apparatus 100 may proceed with the subsequent operation while maintaining the activation mode which is the operation ready state.

Meanwhile, in operation 1106, when there is no button input of the first user interface 401, the first washing apparatus 100 may enter the sleep mode (1110). The time to enter the sleep mode may he when there is no the button input of the first user interface 401 corresponding to the first washing apparatus 100 for the predetermined time (N minutes), and the time to enter the sleep mode is not limited thereto.

When the first washing apparatus 100 enters the sleep mode, the first user interface 401 corresponding to the first washing apparatus 100 is turned off. When the first user interface 401 is turned off, it means that a screen of the first user interface 401 displays an operation screen in which all lighting except a LED lamp of the first start button 403-2 is slowly darkened and turned off.

As described above, in the state where the first washing apparatus 100 enters the sleep mode, the controller 500 may determine whether there is the button input of the first user interface 401 corresponding to the first washing apparatus 100 (1112).

As the result of the determination of operation 1112, when there is no button input of the first user interface 401, the first washing apparatus 100 may return to operation 1110 and proceed with the subsequent operation while maintaining the sleep mode.

Meanwhile, in operation 1112, when there is the button input of the first user interface 401, the first washing apparatus 100 may proceed with operation 1108 to reenter the activation mode which is the operation ready state.

Meanwhile, in the state where the power of the first washing apparatus 100 and the second washing apparatus 200 is simultaneously turned on because the power button 403-1 is turned on in operation 1000, the controller 500 may determine whether the power of the second washing apparatus 200 is turned on (1122).

When the power of the second washing apparatus 200 is turned on, the second washing apparatus 200 may enter operation ready state (1124).

When the second washing apparatus 200 enters the operation ready state, the user may input the button for selecting the washing course and options of the second washing apparatus 200 using the user interface 400.

Accordingly, the controller 500 may determine whether there is the button input of the second user interface 402 corresponding to the second washing apparatus 200 (1126).

As the result of the determination of operation 1126, when there is the button input of the second user interface 402, the second washing apparatus 200 may proceed with the subsequent operation while maintaining the activation mode which is the operation ready state.

Meanwhile, in operation 1126, when there is no the button input of the second user interface 402, the second washing apparatus 200 may enter the sleep mode (1130). The time to enter the sleep mode may be when there is no the button input of the second user interface 402 corresponding to the second washing apparatus 200 for the predetermined time (N minutes), and the time to enter the sleep mode is not limited thereto.

When the second washing apparatus 200 enters the sleep mode, the second user interface 402 corresponding to the second washing apparatus 200 is turned off. When the second user interface 402 is turned off, it means that the screen of the second user interface 402 displays an operation screen in which all lighting except a LED lamp of the second start button 403-3 is slowly darkened and turned off. As described above, in the state where the second washing apparatus 200 enters the sleep mode, the controller 500 may determine whether there is the button input of the second user interface 402 corresponding to the second washing apparatus 200 (1132).

As the result of the determination of operation 1132, when there is the no button input of the second user interface 402, the second washing apparatus 200 may return to operation 1130 and proceed with the subsequent operation while maintaining the sleep mode.

Meanwhile, in operation 1132, when there is the button input of the second user interface 402, the second washing apparatus 200 may proceed with operation 1128 to reenter the activation mode which is the operation ready state.

Next, when the first or second washing apparatus 100 or 200 enters the sleep mode after the predetermined time elapses without the button input, the first or second washing apparatus 100 or 200 may provide various display screens of the sleep mode.

For example, when the second washing apparatus 200 enters the sleep mode among the first and second washing apparatuses 100 and 200, after entering the sleep mode, the second washing apparatus 200 may display the screen providing a phrase "Touch to wake up" on the upper portion of the second user interface 402 corresponding to the second washing apparatus 200.

In addition, when the second washing apparatus 200 enters the sleep mode among the first and second washing apparatuses 100 and 200, after entering the sleep mode, the second washing apparatus 200 may display the screen on which the LED lamp of the second start button 403-3 corresponds to the second washing apparatus 200 is slowly and repeatedly brightened and then darkened.

When the second washing apparatus 200 enters the sleep mode among the first and second washing apparatuses 100 and 200, after entering the sleep mode, the second washing apparatus 200 may display the screen providing a phrase "SLEEP" on a 7-segment 18:88 of the second user interface 402 corresponding to the second washing apparatus 200.

Also, when the second washing apparatus 200 enters the sleep mode among the first and second washing apparatuses 100 and 200, after entering the sleep mode, the second washing apparatus 200 may display the screen for notifying a sleep mode entry as an icon on the upper portion of the second user interface 402 corresponding to the second washing apparatus 200.

Next, in the state where the first or second washing apparatus 100 or 200 enters the sleep mode after the predetermined time elapses without the button input, the first or second washing apparatus 100 or 200 may provide various display screens for releasing the sleep mode through wake-up.

For example, when releasing the sleep mode of the second washing apparatus 200 among the first and second washing apparatuses 100 and 200, the second washing apparatus 200 may display the screen for releasing the sleep mode by touching 'Touch to wake up' provided on the upper portion of the user interface 402. corresponding to the second washing apparatus 200 in the sleep mode of the second washing apparatus 200.

In this case, the sleep mode may be released by selecting any button of the second user interface 402 corresponding to the second washing apparatus 200, but is not limited thereto.

In addition, when releasing the sleep mode of the second washing apparatus 200 among the first and second washing apparatuses 100 and 200, when the user performs wake-up in the sleep mode of the second washing apparatus 200, the second washing apparatus 200 may display an operation screen in which lighting is sequentially turned on to side to side from the center of the second user interface 402.

In addition, when releasing the sleep mode of the second washing apparatus 200 among the first and second washing apparatuses 100 and 200, when the user wakes up the sleep mode of the second washing apparatus 200, the second washing apparatus 200 may display an operation screen in which lighting is sequentially turned on from the left side to the right side of the second user interface 402.

When releasing the sleep mode of the second washing apparatus 200 among the first and second washing apparatuses 100 and 200, when the user wakes up the sleep mode of the second washing apparatus 200, the second washing apparatus 200 may display an operation screen in which lighting is sequentially turned on from where the second user interface 402 is touched to the left and right side.

In addition, when releasing the sleep mode of the second washing apparatus 200 among the first and second washing apparatuses 100 and 200, when the user wakes up the sleep mode of the second washing apparatus 200, the second washing apparatus 200 may display an operation screen in which the overall lighting is slowly brightened.

Next, a process of switching the first or second user interface 401 or 402 to the activation mode by opening the first or second door 160 and 260 while being operated in the sleep mode after the predetermined time has elapsed without the button input to the first or second user interface 401 or 402 will be described with reference to FIG. 9.

FIG. 9 is a flowchart illustrating an activation mode switching control algorithm of the washing machine according to an embodiment of the present disclosure.

Referring to FIG. 9, the user turns on the power button 403-1 of the user interface 400 provided in the control panel 50 (1200).

When the power button 403-1 is turned on, the first washing apparatus 100 and the second washing apparatus 200 are simultaneously turned on while the user interface 400, which has been turned off, is turned on (see FIGS. 5 and 6).

In the state where the power of the first washing apparatus 100 and the second washing apparatus 200 is simultaneously turned on, the controller 500 may determine whether the power of the first washing apparatus 100 is turned on (1202).

When the power of the first washing apparatus 100 is turned on, the first washing apparatus 100 may enter the operation ready state (1204).

When the first washing apparatus 100 enters the operation ready state, the user may input the button for selecting the washing course and options of the first washing apparatus 100 using the first user interface 401.

Accordingly, the controller 500 may determine whether there is the button input corresponding to the first washing apparatus 100 (1206).

As the result of the determination of operation 1206, when there is the button input, the first washing apparatus 100 may proceed with the subsequent operation while maintaining the operation ready state.

Meanwhile, in operation 1206, when there is no button input of the first user interface 401, the first washing apparatus 100 may enter the sleep mode (1210). The time to enter the sleep mode may be when there is no button input of the first user interface 401 corresponding to the first washing apparatus 100 for the predetermined time (N minutes), and the time to enter the sleep mode is not limited thereto.

When the first washing apparatus 100 enters the sleep mode, the first user interface 401 corresponding to the first washing apparatus 100 is turned off. When the first user interface 401 is turned off, it means that a screen of the first user interface 401 displays an operation screen in which all lighting except a LED lamp of the first start button 403-2 is slowly darkened and turned off.

As described above, in the state where the first washing apparatus 100 enters the sleep mode, the controller 500 may determine whether the first door 160 of the first washing apparatus 100 is opened (1212).

As the result of the determination of operation 1212, when the first door 160 of the first washing apparatus 100 is not opened, the first washing apparatus 100 may return to operation 1210 and proceed with the subsequent operation while maintaining the sleep mode.

Meanwhile, in operation 1212, when the first door 160 of the first washing apparatus 100 is opened, the first washing apparatus 100 may proceed with operation 1308 to reenter the activation mode which is the operation ready state.

Meanwhile, in the state where the power of the first washing apparatus 100 and the second washing apparatus 200 is simultaneously turned on because the power button 403-1 is turned on in operation 1300, the controller 500 may determine whether the power of the second washing apparatus 200 is turned on (1222).

When the power of the second washing apparatus 200 is turned on, the second washing apparatus 200 may enter the operation ready state (1224).

When the second washing apparatus 200 enters the operation ready state, the user may input the button for selecting the washing course and options of the second washing apparatus 200 using the user interface 400.

Accordingly, the controller 500 may determine whether there is the button input of the second user interface 402 corresponding to the second washing apparatus 200 (1226).

As the result of the determination of operation 1226, when there is the button input of the second user interface 402, the second washing apparatus 200 may proceed with the subsequent operation while maintaining the activation mode which is the operation ready state.

Meanwhile, in operation 1226, when there is no the button input of the second user interface 402, the second washing apparatus 200 may enter the sleep mode (1230). The time to enter the sleep mode may be when there is no the button input of the second user interface 402 corresponding to the second washing apparatus 200 for the predetermined time (N minutes), and the time to enter the sleep mode is not limited thereto.

When the second washing apparatus 200 enters the sleep mode, the second user interface 402 corresponding to the second washing apparatus 200 is turned off.

As described above, in the state where the second washing apparatus 200 enters the sleep mode, the controller 500 may determine whether the second door 260 of the second washing apparatus 200 is opened (1232).

As the result of the determination of operation 1232, when the second door 260 of the second washing apparatus 200 is not opened, the second washing apparatus 200 may return to operation 1230 and proceed with the subsequent operation while maintaining the sleep mode.

Meanwhile, in operation 1232, when the second door 260 of the second washing apparatus 200 is opened, the second washing apparatus 200 may proceed with operation 1328 to reenter the activation mode which is the operation ready state.

Meanwhile, in an embodiment of the disclosure, when the first and second doors 160 and 260 are opened while the first and second user interfaces 401 and 402 are operated in the sleep mode, the first and second user interfaces 401 and 402 are switched to the activation mode, but the disclosure is not limited thereto. Even if the first and second doors 160 and 260 are closed while the first and second user interfaces 401 and 402 are operated in the sleep mode, the first and second user interfaces 401 and 402 may be configured to switch to the activation mode.

Next, when first and second power buttons 406-1 and 407-1 are formed in the first and second user interfaces 406 and 407, respectively, a method of switching the first and second user interfaces 406 and 407 from the sleep mode to the activation mode by using the first and second power buttons 406-1 and 407-1 will be described with reference to FIGS. 10 to 19.

Figure 10:
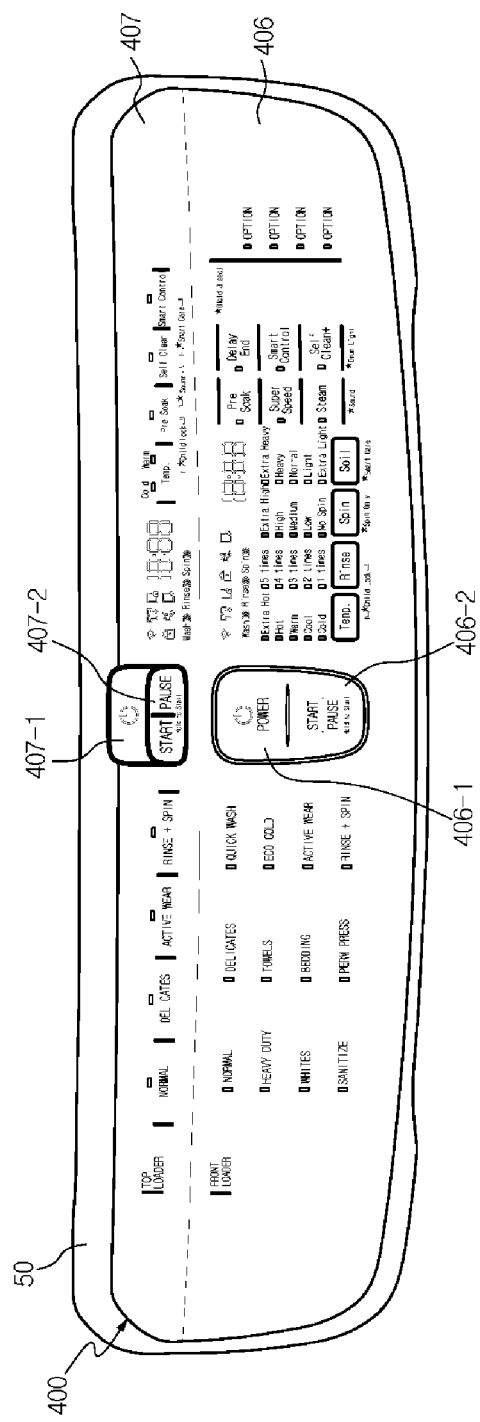
FIG. 10 is a view illustrating a control panel of a washing machine according to another embodiment of the present disclosure.

FIG. 10 is a view illustrating a control panel of a washing machine according to another embodiment of the disclosure.

Referring to FIG. 10, a user interface 400 may be provided in a control panel 50 to interact with the user. For example, the user interface 400 may receive the user input for first and second washing apparatuses 100 and 200 from the user, and may display the user input or operation information corresponding to the process state.

The user interface 400 may include a first user interface 406 provided in the lower area of the control panel 50 and configured to receive a first control command for controlling the first washing apparatus 100, and a second user interface 407 provided in the lower area of the control panel 50 and configured to receive a second control command for controlling the second washing apparatus 200.

The first and second user interfaces 406 and 407 may be operated in the activation mode in which the first and second washing apparatuses 100 and 200 are controlled according to the first and second control commands, respectively, and the sleep mode in which the first and second washing apparatuses 100 and 200 are not controlled according to the first and second control command, respectively.

The first and second user interfaces 406 and 407 may include the plurality of buttons (e.g., reservation, wash water temperature, number of rinsing, washing, rinsing, dehydration, selection of a water level, etc.) through which user commands related to operations of the washing machine 1 are input. In addition, the first and second user interfaces 406 and 407 may include the additional option buttons for simultaneously controlling the first and second washing apparatuses 100 and 200.

Also, the first and second user interfaces 406 and 407 may include first and second power buttons 406-1 and 407-1 configured to receive first and second mode switch commands for switching the first and second user interfaces 406 and 407 from the sleep mode to the activation mode, respectively.

In addition, the first and second user interfaces 406 and 407 may include first and second start buttons 406-2 and 407-2 for starting or pausing the operation of the first and second washing apparatuses 100 and 200.

The operation processes and effects of the washing machine and the method of controlling the washing machine according to another embodiment of the disclosure will hereinafter be described in detail.

Figure 11A:
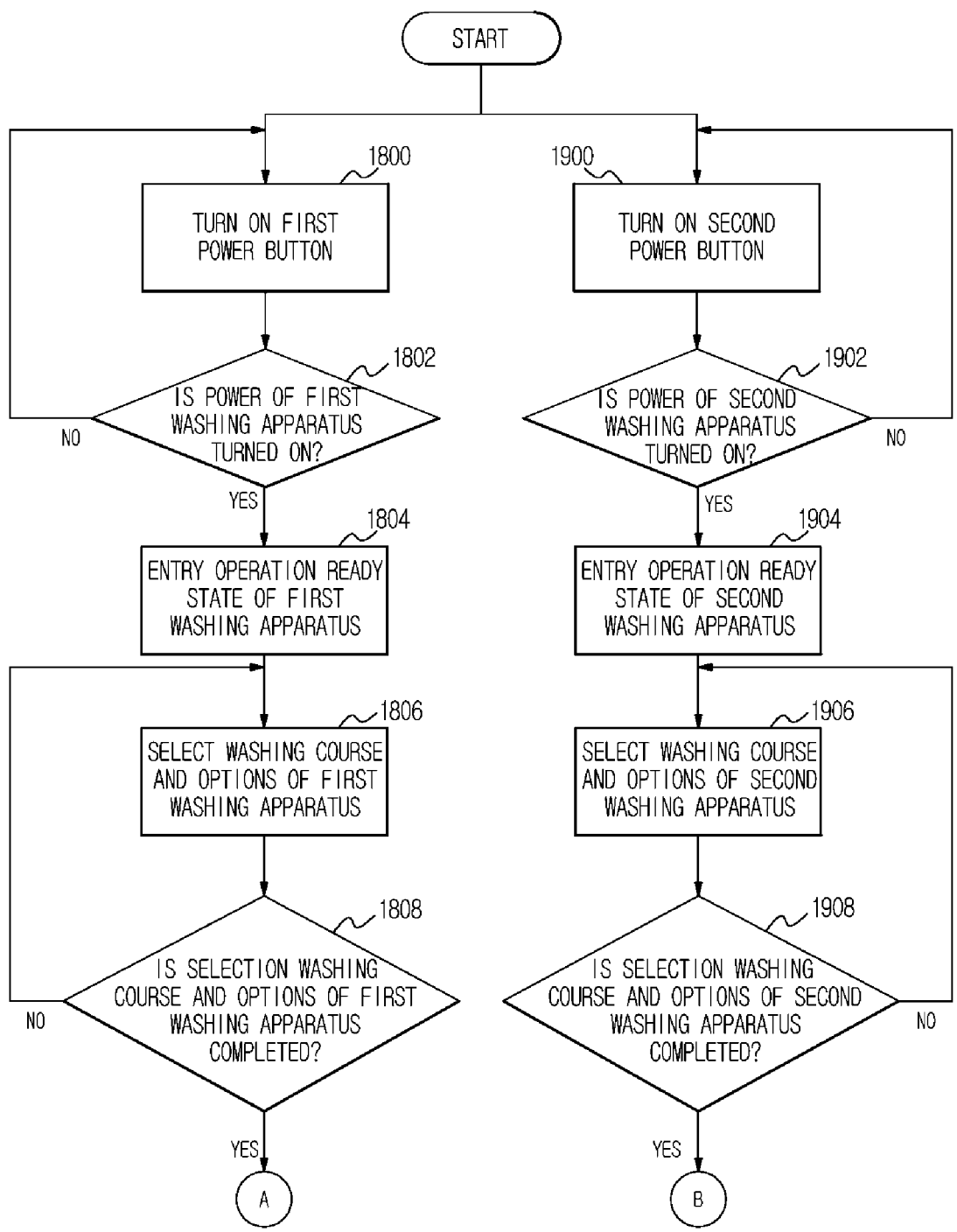
Figure 11B:
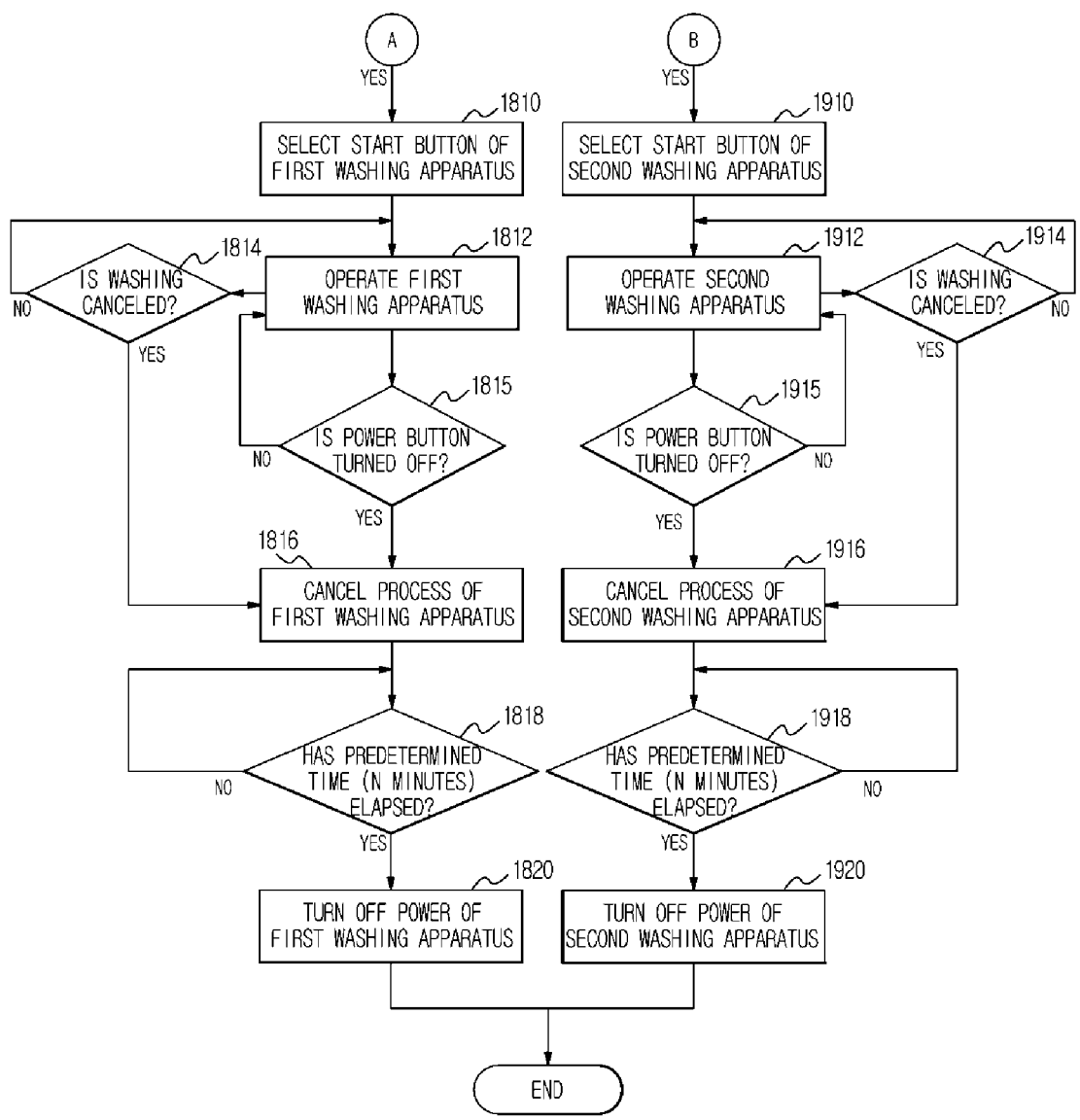
Figure 15:
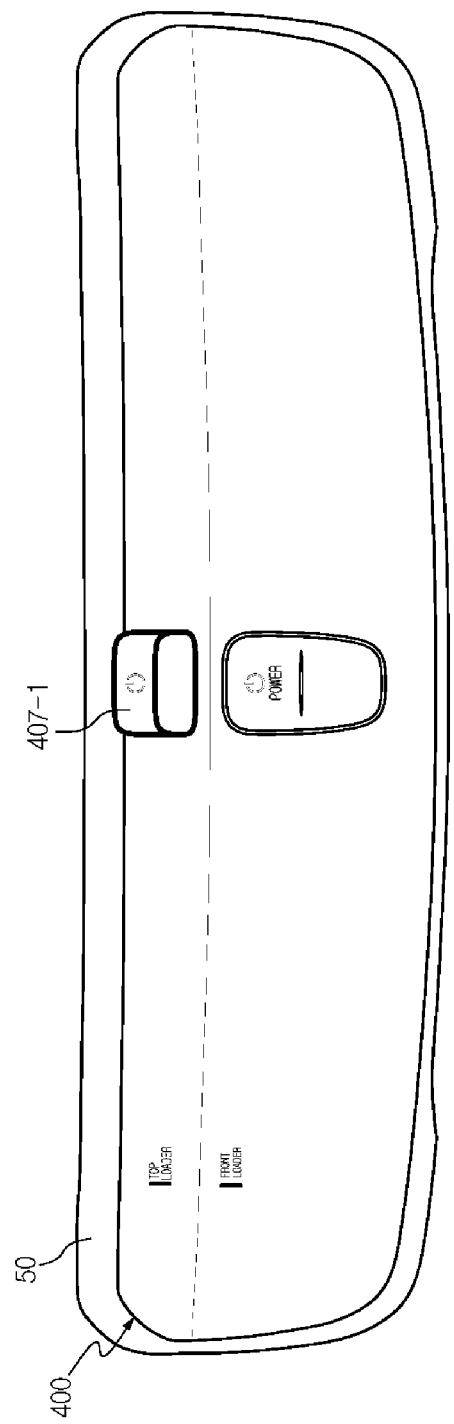

FIG. 11 is a flowchart illustrating an individual power mode control algorithm of a washing machine according to another embodiment of the present disclosure, FIG. 12 is a view illustrating a state in which a control panel of a first washing apparatus is turned off as an individual power in the washing machine according to another embodiment of the present disclosure, FIG. 13 is a view illustrating a state in which the control panel of the first washing apparatus is turned on as an individual power in the washing machine according to another embodiment of the present disclosure, FIG. 14 is a view illustrating a state in which a laundry cancel button is activated on the control panel of the first washing apparatus in the washing machine according to another embodiment of the present disclosure, FIG. 15 is a view illustrating a state in which a control panel of a second washing apparatus is turned off as an individual power in the washing machine according to another embodiment of the present disclosure, FIG. 16 is a view illustrating a state in which the control panel of the second washing apparatus is turned on as an individual power in the washing machine according to another embodiment of the present disclosure, and FIG. 17 is a view illustrating a state in which a laundry cancel button is activated on the control panel of the second washing apparatus in the washing machine according to another embodiment of the present disclosure.

Referring to FIG. 11, the user may turn on the first power button 406-1 of the first user interface 406 provided on the control panel 50 (1800).

When the first power button 406-1 is turned on, the first washing apparatus 100 is turned on while the first user interface 406, which has been turned off as illustrated in FIG. 13, is turned on as illustrated in FIG. 14.

In the state where the power of the first washing apparatus 100 is turned on, the controller 500 may determine whether the power of the first washing apparatus 100 is turned on (1802).

When the power of the first washing apparatus 100 is turned on, the first washing apparatus 100 may enter the operation ready state (1804).

When the first washing apparatus 100 enters the operation ready state, the user may select the washing course and options of the first washing apparatus 100 using the first user interface 406 (1806).

Subsequently, the controller 500 may determine whether the selection of the washing course and options of the first washing apparatus 100 is completed (1808).

As the result of the determination of operation 1808, when the selection of the washing course and options of the first washing apparatus 100 is not completed, the controller 500 may return to operation 1806 to proceed with the subsequent operation.

In operation 1808, when the selection of the washing course and options of the first washing apparatus 100 is completed, the user may select the first start button 406-2 of the first washing apparatus 100 (1810).

When the first start button 406-2 is selected, the first washing apparatus 100 may start the operation according to the selected washing course and options and proceed with the washing process, the rinsing process, and the dehydrating process (1812).

When the operation of the first washing apparatus 100 is started, as illustrated FIG. 14, a first cancel button 406-3 may be activated in the first user interface 406.

As such, when the user selects the first washing cancel button 406-3 of the first washing apparatus 100 while the washing process, the rinsing process, and the dehydrating process of the first washing apparatus 100 are performed, the controller 500 may determine whether the first washing cancel button 406-3 is selected (1814).

As the result of the determination of operation 1814, when the first washing cancel button 406-3 is not selected, the controller 500 may return to operation 1812 to continue the process of the first washing apparatus 100.

101841 In operation 1814, when the first washing cancel button 406-3 is selected, the controller 500 may cancel the process of the first washing apparatus 100 (1816).

Subsequently, the controller 500 may count the time at which the process of the first washing apparatus 100 is canceled by using the built-in timer 503, and determine whether the counted time has elapsed the predetermined time (N minutes; the reference time for determining whether the process of the first washing apparatus is canceled, about 3 minutes) (1818). This is to determine whether the predetermined time (about 3 minutes) has elapsed since the first washing cancel button 406-3 was selected and this is because the user may press the first washing cancel button 406-3 by mistake.

As the result of the determination of operation 1818, when the time, in which the process of the first washing apparatus 100 is canceled, elapses the predetermined time (N minutes), the controller 500 may determine that the predetermined time elapses after the first washing cancel button 406-3 is selected.

Therefore, after the predetermined time elapses after the first washing cancel button 406-3 is selected, the controller 500 may turn off the power of the first washing apparatus 100 (1820) and terminate the operation.

On the other hand, during the process (washing process, rinsing process, and dehydrating process) of the first washing apparatus 100 in operation 1812, when the user turns off the first power button 406-1, the controller 500 may determine whether the first power button 406-1 is turned off (1815).

As the result of the determination in operation 1815, when the first power button 406-1 is not turned off, the controller 500 may return to operation 1812 to continue the process of the first washing apparatus 100.

On the other hand, when the first power button 406-1 is turned off as the result of the determination of operation 1815, the controller 500 may proceed with operation 1816 to cancel the process of the first washing apparatus 100, and proceed with the subsequent operation.

Meanwhile, the user may turn on the second power button 407-1 of the second user interface 407 provided on the control panel 50 (1900).

When the second power button 407-1 is turned on, the second washing apparatus 200 is turned on while the second interface 407, which has been turned off as illustrated in FIG, 15, is turned on as illustrated in FIG. 16.

In the state where the power of the second washing apparatus 200 is turned on, the controller 500 may determine whether the power of the second washing apparatus 200 is turned on (1902).

When the power of the second washing apparatus 200 is turned on, the second washing apparatus 200 may enter the operation ready state (1904).

When the second washing apparatus 200 enters the operation ready state, the user may select the washing course and options of the second washing apparatus 200 using the second user interface 407 (1906).

Subsequently, the controller 500 may determine whether the selection of the washing course and options of the second washing apparatus 200 is completed (1908).

As the result of the determination of operation 1908, when the selection of the washing course and options of the second washing apparatus 200 is not completed, the controller 500 may return to operation 1906 to proceed with the subsequent operation.

In operation 1908, when the selection of the washing course and options of the second washing apparatus 200 is completed, the user may select the second start button 407-2 of the second washing apparatus 200 (1910).

When the second start button 407-2 is selected, the second washing apparatus 200 may start the operation according to the selected washing course and options and proceed with the washing process, the rinsing process, and the dehydrating process (1912).

When the operation of the second washing apparatus 200 is started, as illustrated. in FIG. 17, a second cancel button 407-3 may be activated in the second user interface 407.

As such, when the user selects the second washing cancel button 406-3 of the second washing apparatus 200 while the washing process, the rinsing process, and the dehydrating process of the second washing apparatus 200 are performed, the controller 500 may determine whether the second washing cancel button 407-3 is selected (1914).

As the result of the determination of operation 1914, when the second washing cancel button 407-3 is not selected, the controller 500 may return to operation 1912 to continue the process of the second washing apparatus 200.

In operation 1914, when the second washing cancel button 407-3 is selected, the controller 500 may cancel the process of the second washing apparatus 200 (1916).

Subsequently, the controller 500 may count the time at which the process of the second washing apparatus 200 is canceled by using the built-in timer 503, and determine whether the counted time has elapsed the predetermined time minutes; the reference time for determining whether the process of the second washing apparatus is canceled, about 3 minutes) (1918). This is to determine whether the predetermined time (about 3 minutes) has elapsed since the second washing cancel button 407-3 was selected and this is because the user may press the second washing cancel button 407-3 by mistake.

As the result of the determination of operation 1918, when the time, in which the process of the second washing apparatus 200 is canceled, elapses the predetermined time (N minutes), the controller 500 may determine that the predetermined time elapses after the second washing cancel button 407-3 is selected.

Therefore, after the predetermined time elapses after the second washing cancel button 407-3 is selected, the controller 500 may turn off the power of the second washing apparatus 200 (1920) and terminate the operation.

On the other hand, during the process (washing process, rinsing process, and dehydrating process) of the second washing apparatus 200 in operation 1912, when the user turns off the second power button 407-1, the controller 500 may determine whether the second power button 407-1 is turned off (1915).

As the result of the determination in operation 1915, when the second power button 407-1 is not turned off, the controller 500 may return to operation 1912 to continue the process of the second washing apparatus 200.

On the other hand, when the second power button 407-1 is turned off as the result of the determination of operation 1915, the controller 500 may proceed with operation 1916 to cancel the process of the second washing apparatus 200, and proceed with the subsequent operation.

Next, a process of entering the sleep mode when the predetermined time elapses without the button input to the first or second user interface 406 or 407 will be described with reference to FIG. 18.

FIG. 18 is a flowchart illustrating a sleep mode control algorithm of the washing machine according to another embodiment of the disclosure.

Referring to FIG. 18, the user may turn on the first power button 406-1 of the first user interface 406 provided in the control panel 50 (2100).

When the first power button 406-1 is turned on, the first washing apparatus 100 is turned on while the first user interface 406, which has been turned off, is turned on (see FIGS. 14 and 15).

When the power of the first washing apparatus 100 is turned on, the controller 500 may determine whether the power of the first washing apparatus 100 is turned on (2102).

When the power of the first washing apparatus 100 is turned on, the first washing apparatus 100 may enter the activation mode which is the operation ready state (2104).

When the first washing apparatus 100 enters the operation ready state, the controller 500 may determine whether there is the button input of the first user interface 406 corresponding to the first washing apparatus 100 (2106).

As the result of the determination of operation 2106, when there is the button input of the first user interface 406, the first washing apparatus 100 may proceed with the subsequent operation while maintaining the activation mode which is the operation ready state.

Meanwhile, in operation 2106, when there is no button input of the first user interface 406, the first washing apparatus 100 may enter the sleep mode (2110). The time to enter the sleep mode may be when there is no the button input of the first user interface 406 corresponding to the first washing apparatus 100 for the predetermined time (N minutes), and the time to enter the sleep mode is not limited thereto.

When the first washing apparatus 100 enters the sleep mode, the first user interface 406 corresponding to the first washing apparatus 100 is turned off. When the first user interface 406 is turned off, it means that the screen of the first user interface 406 displays the operation screen in which all lighting except a LED lamp of the first start button 406-2 is slowly darkened and turned off.

As described above, in the state where the first washing apparatus 100 enters the sleep mode, the controller 500 may determine whether there is the button input of the first user interface 406 corresponding to the first washing apparatus 100 (2112).

As the result of the determination of operation 2112, when there is no the button input of the first user interface 406, the first washing apparatus 100 may return to operation 2110 and proceed with the subsequent operation while maintaining the sleep mode.

Meanwhile, in operation 2112, when there is the button input of the first user interface 406, the first washing apparatus 100 may proceed with operation 2108 to reenter the activation mode which is the operation ready state.

On the other hand, the user may turn on the second power button 407-1 of the second user interface 407 provided in the control panel 50 (2200).

When the second power button 407-1 is turned on, the second washing apparatus 200 is turned on while the second user interface 407, which has been turned off, is turned on (see 17 and 18).

When the power of the second washing apparatus 200 is turned on, the controller 500 may determine whether the power of the second washing apparatus 200 is turned on (2202).

When the power of the second washing apparatus 200 is turned on, the second washing apparatus 200 may enter the operation ready state (2204).

When the second washing apparatus 200 enters the operation ready state, the controller 500 may determine whether there is the button input of the second user interface 407 corresponding to the second washing apparatus 200 (2206).

As the result of the determination of operation 2206, when there is the button input of the second user interface 407, the second washing apparatus 200 may proceed with the subsequent operation while maintaining the activation mode which is the operation ready state.

Meanwhile, in operation 2206, when there is no button input of the second user interface 407, the second washing apparatus 200 may enter the sleep mode (2210).

When the second washing apparatus 200 enters the sleep mode, the second user interface 407 corresponding to the second washing apparatus 200 is turned off.

As described above, in the state where the second washing apparatus 200 enters the sleep mode, the controller 500 may determine whether there is the button input of the second user interface 407 corresponding to the second washing apparatus 200 (2212).

As the result of the determination of operation 2212, when there is no the button input of the second user interface 407, the second washing apparatus 200 may return to operation 2210 and proceed with the subsequent operation while maintaining the sleep mode.

Meanwhile, in operation 2212, when there is the button input of the second user interface 407, the second washing apparatus 200 may proceed with operation 2208 to reenter the activation mode which is the operation ready state.

Next, the process of switching the first or second user interface 401 or 402 to the activation mode by opening the first or second door 160 and 260 while being operated in the sleep mode after the predetermined time has elapsed without the button input to the first or second user interface 406 or 407 will be described with reference to FIG. 19.

FIG. 19 is a flowchart illustrating an activation mode switching control algorithm of the washing machine according to another embodiment of the present disclosure.

Referring to FIG. 19, the user turns on the first power button 406-1 of the first user interface 406 provided in the control panel 50 (2300).

When the first power button 406-1 is turned on, the first washing apparatus 200 is turned on while the first user interface 406, which has been turned off, is turned on (see FIGS. 12 and 13).

When the power of the first washing apparatus 100 is turned on, the controller 500 may determine whether the power of the first washing apparatus 100 is turned on (2302).

When the power of the first washing apparatus 100 is turned on, the first washing apparatus 100 may enter the activation mode which is the operation ready state (2304).

When the first washing apparatus 100 enters the operation ready state, the controller 500 may determine whether there is the button input of the first user interface 406 corresponding to the first washing apparatus 100 (2306).

As the result of the determination of operation 2306, when there is the button input of the first user interface 406, the first washing apparatus 100 may proceed with the subsequent operation while maintaining the operation ready state.

Meanwhile, in operation 2306, when there is no button input of the first user interface 406, the first washing apparatus 100 may enter the sleep mode (2310).

When the first washing apparatus 100 enters the sleep mode, the first user interface 401 corresponding to the first washing apparatus 100 is turned off.

As described above, in the state where the first washing apparatus 100 enters the sleep mode, the controller 500 may determine whether the first door 160 of the first washing apparatus 100 is opened (2312).

As the result of the determination of operation 2312, when the first door 160 of the first washing apparatus 100 is not opened, the first washing apparatus 100 may return to operation 2310 and proceed with the subsequent operation while maintaining the sleep mode.

Meanwhile, in operation 2312, when the first door 160 of the first washing apparatus 100 is opened, the first washing apparatus 100 may proceed with operation 2308 to reenter the activation mode which is the operation ready state.

On the other hand, the user turns on the second power button 407-1 of the second user interface 407 provided in the control panel 50 (2400).

When the second power button 407-1 is turned on, the second washing apparatus 200 is turned on while the second user interface 407, which has been turned off, is turned on (see FIGS. 15 and 16).

When the power of the second washing apparatus 200 is turned on, the controller 500 may determine whether the power of the second washing apparatus 200 is turned on (2402).

When the power of the second washing apparatus 200 is turned on, the second washing apparatus 200 may enter the operation ready state (2404).

When the second washing apparatus 200 enters the operation ready state, the controller 500 may determine whether there is the button input of the second user interface 407 corresponding to the second washing apparatus 200 (2406).

As the result of the determination of operation 2406, when there is the button input of the second user interface 407, the second washing apparatus 200 may proceed with the subsequent operation while maintaining the operation ready state.

Meanwhile, in operation 2406, when there is no button input of the second user interface 407, the second washing apparatus 200 may enter the sleep mode (2410).

As described above, in the state where the second washing apparatus 200 enters the sleep mode, the controller 500 may determine whether the second door 260 of the second washing apparatus 200 is opened (2412).

As the result of the determination of operation 2412, when the second door 260 of the second washing apparatus 200 is not opened, the second washing apparatus 200 may return to operation 2410 and proceed with the subsequent operation while maintaining the sleep mode.

Meanwhile, in operation 2412, when the second door 260 of the second washing apparatus 200 is opened, the second washing apparatus 200 may proceed with operation 2408 to reenter the activation mode which is the operation ready state.

The above-mentioned embodiments are disclosed only for illustrative purposes. The above-mentioned disclosures are used only to indicate the embodiments, and the disclosure can also be used in various combinations, modifications and environments without departing from the scope or spirit of the disclosure. That is, the disclosure can be readily modified or changed within the scope of the disclosure, within the scope equivalent to the disclosed content, and/or within the scope of technology or knowledge well known to those skilled in the art. The above-mentioned embodiments have exemplarily described the best mode for implementing a technical idea of the disclosure, and various modifications needed for detailed application fields and utilities can also be made available. Therefore, the above-mentioned embodiments are exemplary and explanatory and are not intended to limit the scope of the disclosure. In addition, the appended claims may conceptually include other embodiments or examples without departing from e scope or spirit of the disclosure as necessary.

As described above, the disclosure may implement the control panel that is simple to operate and easy to use by controlling the plurality of washing apparatuses using one power button.

The invention claimed is:

1. A clothes treatment system comprising:
   a first apparatus;
   a second apparatus disposed above the first apparatus;
   one control panel, disposed at a front of the second apparatus and higher than the first apparatus, including a first user interface provided in a lower area, a second user interface provided in an upper area above the lower area, and a third user interface; and
   a controller configured to control the one control panel,
   wherein the first user interface, located closer to a first door of the first apparatus than the second user interface, is configured for receiving a first user input associated with the first apparatus,
   wherein the second user interface, located closer to a second door of the second apparatus than the first user interface, is configured for receiving a second user input associated with the second apparatus,
   wherein the first user interface and the second user interface are turned on in an activation mode, and the first user interface and the second user interface are completely turned off in a deactivation mode,
   wherein the third user interface is configured to receive a third user input for switching the first user interface and the second user interface from the deactivation mode to the activation mode,
   wherein the first apparatus is a washer comprising:
      a first drum in a cylindrical shape with an open front; and
      a first front frame to which the first door is coupled such that the first door corresponds to the open front of the first drum,
   wherein the one control panel is disposed in direct contact with an upper portion of the first front frame,
   wherein the first user interface is configured to be switched by the controller to the deactivation mode in response to the first user input not being received for a predetermined time, independent of whether the second user interface is in the activation mode,
   wherein the second user interface is configured to be switched by the controller to the deactivation mode in response to the second user input not being received for the predetermined time, independent of whether the first user interface is in the activation mode, and
   wherein the first user interface or the second user interface is configured to be reactivated by the controller subsequent to being deactivated by the controller in response to the third user interface receiving a user input.

2. The clothes treatment system according to claim 1, wherein the third user interface is provided in the lower area of the control panel.

3. The clothes treatment system according to claim 1, wherein the first or the second user interface is configured to be switched to the deactivation mode when the first or second apparatus is not driven for a predetermined time while being operated in the activation mode.

4. The clothes treatment system according to claim 1, wherein the first user interface is configured to be switched to the activation mode when the first user input is received while the first user interface is operating in the deactivation mode, and
   wherein the second user interface is configured to be switched to the activation mode when the second user input is received while the second user interface is operating in the deactivation mode.

5. The clothes treatment system according to claim 1, wherein the first apparatus comprises a first laundry inlet into which laundry to be treated in the first apparatus is put and the first door configured to open and close the first laundry inlet, and
   wherein the first user interface is configured to be switched to the activation mode when the first door is opened or closed while the first user interface is operating in the deactivation mode.

6. The clothes treatment system according to claim 2, wherein the second apparatus comprises a second laundry inlet into which laundry to be treated in the second apparatus is put and the second door configured to open and close the second laundry inlet, and
   wherein the second user interface is configured to be switched to the activation mode when the second door is closed or opened while the second user interface is operating in the deactivation mode.

7. A clothes treatment system comprising:
   a first apparatus;
   a second apparatus disposed above the first apparatus;
   one control panel, disposed at a front of the second apparatus and higher than the first apparatus, including a first user interface provided in a lower area, a second user interface provided in an upper area above the lower area; and
   a controller configured to control the one control panel,
   wherein the first user interface, located closer to a first door of the first apparatus than the second user interface, is configured for receiving a first user input associated with the first apparatus,
   wherein the second user interface, located closer to a second door of the second apparatus than the first user interface, is configured for receiving a second user input associated with the second apparatus,
   wherein the first user interface and the second user interface are turned on in an activation mode, and the first user interface and the second user interface are completely turned off in a deactivation mode,
   wherein the first user interface comprises a first power button configured to receive a first mode switch command for switching the first user interface from the deactivation mode to the activation mode,
   wherein the second user interface comprises a second power button configured to receive a second mode switch command for switching the second user interface from the deactivation mode to the activation mode,
   wherein the first apparatus is a washer comprising:

a first drum in a cylindrical shape with an open front; and a first front frame to which the first door is coupled such that the first door corresponds to the open front of the first drum, and wherein the one control panel is disposed in direct contact with an upper portion of the first front frame, wherein the first user interface is configured to be switched by the controller to the deactivation mode in response to the first user input not being received for a predetermined time, independent of whether the second user interface is in the activation mode, wherein the second user interface is configured to be switched by the controller to the deactivation mode in response to the second user input not being received for the predetermined time, independent of whether the first user interface is in the activation mode, and wherein the first user interface or the second user interface is configured to be reactivated by the controller in response to receiving a user input subsequent to being deactivated by the controller.

8. The clothes treatment system according to claim 7, wherein the first or the second user interface is configured to be switched to the deactivation mode when the first or second apparatus is not driven for a predetermined time while being operated in the activation mode.

9. The clothes treatment system according to claim 7, wherein the first apparatus comprises a first laundry inlet into which laundry to be treated in the first apparatus is put and the first door configured to open and close the first laundry inlet, and wherein the first user interface is configured to be switched to the activation mode when the first door is opened or closed while the first user interface is operating in the deactivation mode.

10. The clothes treatment system according to claim 7, wherein the second apparatus comprises a second laundry inlet into which laundry to be treated in the second apparatus is put and the second door configured to open and close the second laundry inlet, and wherein the second user interface is configured to be switched to the activation mode when the second door is closed or opened while the second user interface is operating in the deactivation mode.

* * * * *